United States Patent [19]

Novak

[11] 4,341,641
[45] Jul. 27, 1982

[54] PROCESS FOR TREATING CYANIDE AND CYANATE CONTAINING WASTEWATERS

[75] Inventor: Frederick C. Novak, South Huntington, N.Y.

[73] Assignee: TII Corporation, Lindenhurst, N.Y.

[21] Appl. No.: 112,175

[22] Filed: Jan. 15, 1980

Related U.S. Application Data

[63] Continuation of Ser. No. 931,958, Aug. 8, 1978, abandoned.

[51] Int. Cl.³ .............................................. C02F 1/78
[52] U.S. Cl. .................................. 210/752; 210/760; 210/765; 210/904
[58] Field of Search ........... 210/63 Z, 63 R, DIG. 31, 210/195 R, 219; 261/DIG. 42, 93, 87

[56] References Cited

U.S. PATENT DOCUMENTS

| | | | |
|---|---|---|---|
| 3,391,789 | 7/1968 | Zievers et al. | 210/DIG. 31 |
| 3,823,923 | 7/1974 | Chapsal | 261/DIG. 42 |
| 3,920,547 | 11/1975 | Garrison et al. | 210/DIG. 31 |
| 3,945,918 | 3/1976 | Kirk | 210/63 Z |
| 4,105,545 | 8/1978 | Muller et al. | 210/DIG. 31 |
| 4,132,637 | 1/1979 | Key et al. | 210/63 Z |

FOREIGN PATENT DOCUMENTS

| | | | |
|---|---|---|---|
| 1929254 | 12/1970 | Fed. Rep. of Germany | 210/63 Z |
| 78966 | 1/1971 | German Democratic Rep. | 210/904 |
| 394322 | 12/1973 | U.S.S.R. | 210/63 Z |
| 469667 | 11/1975 | U.S.S.R. | 210/63 Z |

Primary Examiner—Benoit Castel
Attorney, Agent, or Firm—Ronald G. Goebel

[57] ABSTRACT

A process for treating a cyanide and cyanate-containing aqueous influent such as a wastewater stream is provided. A two-stage method is included for destroying a cyanide-containing influent which comprises;

(a) introducing said cyanide-containing influent into a first ozone-contacting zone;
(b) contacting said influent in said first zone with a second ozone-containing gas, at least a portion of said second ozone-containing gas comprising a first ozone-depleted gas withdrawn from a second contact zone to form a first cyanide-depleted effluent and a second ozone-depleted gas;
(c) introducing said first cyanide-depleted effluent into a second ozone-contacting zone;
(d) contacting said effluent in said second zone with a first ozone-containing gas to form a second cyanide-depleted effluent and a first ozone-depleted gas;
(e) withdrawing said first ozone-depleted gas from said second contact zone; and
(f) withdrawing said second cyanide-depleted effluent from said second zone.

A single stage method is also provided in this invention. Both single stage and double stage embodiments employ a turbine-gas injector in each ozone-contacting zone to accomplish a high mass transfer of the ozone-containing gas to the influent.

In both the single stage and double stage method, the cyanide-depleted effluents may be recycled to the aqueous influent stream prior to its introduction to either the first or second ozone-contacting zone or to the contacting zones themselves to destroy cyanides and cyanates in these effluents. This destruction is accomplished by allowing residual ozone or other oxidizing species in the recycled effluent to react with the cyanide/cyanate species and reducing influent concentrations by diluting the influent entering the contacting zones while at the same time obtaining lower ozone-containing gas to liquid (G/L) ratios.

In a further embodiment of this invention a method for treating a cyanate-containing influent formed by oxidizing cyanide by any of the above described methods is provided which comprises further multiple ozone-treatment stages.

38 Claims, 5 Drawing Figures

PROCESS FOR TREATING CYANIDE AND CYANATE CONTAINING WASTEWATERS

This is a continuation of application Ser. No. 931,958, filed Aug. 8, 1978, now abandoned.

BACKGROUND OF THE INVENTION

This invention is primarily concerned with a method for treating aqueous cyanide-containing liquors with an ozone-containing gas to substantially destroy the cyanide content therein. The present invention is also concerned with destroying substantial amounts of cyanates in such liquors formed by the initial oxidation of cyanides.

Simple cyanides as well as complex cyanide compounds are present in the waste effluents from certain chemical operations such as metal plating processes, photographic processes, mining operations, and metal refining processes. Because of the toxic nature of these cyanides and the potential hazard of contaminating water supplies, these effluents cannot be discharged into rivers or lakes without pretreatment to reduce cyanide levels. This contamination problem is not avoided by discharging such effluents on land since the cyanides can eventually pass through the soil and reach water supplies. In order to protect the environment and the public at large, federal and state governments have prescribed limits on the levels of cyanides in effluents discharged from such chemical operations.

Cyanates, which are formed by the initial oxidation of cyanides, are less toxic than cyanide but nonetheless present a potential danger to the environment. Government regulations have not yet been promulgated for cyanate discharge but it is expected that such regulations will be forthcoming. Therefore, there is a substantial need for an efficient method of destroying cyanides in wastewater effluents to acceptable levels and also for a method which reduces the cyanate content in the effluent finally discharged to the environment.

In the past, attempts at substantially destroying cyanides contained in wastewater effluent streams have either been too inefficient or too expensive for large scale commercial treatments.

For example, toxic cyanides can be precipitated as insoluble heavy metal compounds by the addition of a heavy metal salt to a cyanide-containing liquor. Unfortunately, complete elimination of cyanides is not accomplished by this method and it requires costly and bulky equipment.

Oxidation of cyanides to cyanates and then to carbon dioxide and nitrogen by alkaline chlorination has also been described in the art. One of the initial products, cyanyl chloride, however, is also toxic and destruction of it is slow which often results in incomplete treatment of the effluent. Moreover, the addition of agents to control pH adds to the total dissolved solids in the effluent.

The use of peroxides to oxidize cyanide has also been suggested but is considered commercially prohibitive due to the high cost of materials.

Another problem shared by the above methods is their inability to break down metal-complexed cyanides such as iron cyanide.

More recently, ozone-containing gases such as ozone-air, ozone-oxygen and ozone-air and oxygen, either alone or in combination with a U.V. light treatment, have been employed as cyanide treatment agents for wastewater effluents because they are relatively inexpensive to produce and are efficient oxidants for cyanides. Ozone rapidly oxidizes cyanide to cyanate if a high mass transfer of ozone to the effluent is accomplished. The oxidation of cyanate to gaseous nitrogen and carbon dioxide however, is kinetically controlled and therefore requires significant additional contact time with ozone. Metal complexed cyanides such as iron cyanides are not usually destroyed by ozonation.

In U.S. Pat. No. 3,920,547 to R. L. Garrison et al., a method for the destruction of cyanides, particularly cyanides complexed with iron in an aqueous cyanide solution is provided comprising contacting the solution with an ozone-containing gas while simultaneously irradiating the aqueous cyanide solution with ultra-violet light. The method is preferably carried out while maintaining the pH of the solution between 5 and 9 at temperatures of between 30° C. and 70° C. It is also preferred to contact the aqueous cyanide solution and ozone-containing gas in a plurality of separate zones, one atop the other in a tower, countercurrently or by parallel flow, with the simultaneous irradiation with UV light being carried out in at least one of the separate contact zones, preferably in the last zone where the cyanide ion concentration is a minimum and reaction rate must be enhanced.

To provide for a more efficient dispersion of ozone-containing gas, each zone in the tower can be equipped with a means to provide small bubbles in the solution such as a mixer, porous stone diffuser, ozone ejector or other suitable means to obtain a satisfactory mass transfer of ozone from the gas to the liquid phase.

In U.S. Pat. No. 3,732,163 to W. Lapidot, a process and apparatus for treating industrial waste streams is described employing a plurality of ozone treatment zones wherein a major portion (70% to 95%) of the liquid to be treated is introduced into the upper portion of a first ozonation zone and the remaining portion of the liquid is introduced into a second ozonation zone, each zone comprising a packed tower. An ozone-containing gas mixture enters the bottom of the first zone, contacts the liquid therein and is discharged to the lower portion of the second zone. The treated effluent from the first and second zones can each be returned or combined and returned to the natural source from where the liquid was obtained or can be recycled for use as fresh water. The outlet stream from the second zone can be directed to the first zone to insure that this portion of the water receives the full ozone treatment at all times. The gaseous stream removed from the upper portion of the second ozonation zone is then utilized for the regeneration of the ozone-containing gas by mixing with oxygen, drying, bleeding to remove nitrogen and then introducing it to an ozone-generation device.

The present invention, on the other hand, deals with an efficient method of treating a cyanide-containing aqueous liquor with an ozone-containing gas in at least one ozone-contacting zone to destroy cyanides contained therein by providing a high-mass transfer of ozone to the aqueous liquor.

The high mass transfer of ozone to influent is accomplished by employing a turbine gas injector in each zone. The injector spins a portion of the wastewater influent in a turbine-bladed impeller rotor at high speed and mixes the wastewater with an ozone-containing gas, which gas is broken down into small bubbles by the mixing and distributed in the influent portion. This stream of ozone-containing gas and influent is then injected into the zone containing a volume of wastewater influent.

By recycling at least a portion of treated liquor from the contacting zone to either the influent liquor stream or to the zone itself, or by retaining said portion in a holding zone and then recycling, additional cyanide as well as cyanate, formed as an intermediate in the cyanide oxidation, is also oxidized by the direct ozone treatment in the zone and the residual oxidants in the recycled liquor.

When carried out in two or more ozone-contacting zones wherein at least a portion of an ozone-containing gas from an ozone source contacts liquor in the latter zones and the expended gas therefrom is used as at least a portion of the ozone treating gas for the earlier stages, with any remainder of treating gas being supplied by the ozone source, substantially complete ozone utilization is achieved in destroying cyanide.

By recycling or retaining and recycling at least a portion of treated effluent from one or more latter zones to an earlier zone or to incoming untreated liquor itself, increased cyanide and cyanate oxidation is accomplished. In addition, certain free and complexed metals in the wastewater such as copper, iron and zinc are oxidized to an insoluble and filterable or settleable state.

A process for substantially destroying cyanate which is formed by the oxidation of cyanide by any of the cyanide-treatment processes of this invention is also provided.

SUMMARY OF THE INVENTION

Basically the present invention comprises introducing a cyanide-containing liquid influent into at least one ozone treatment zone wherein the influent is mixed with an ozone-containing gas at high speed to impart a high velocity to the influent and to break the gas into small bubbles. This treatment achieves a high mass transfer of ozone to the influent thereby insuring optimum reaction conditions for the oxidative destruction of cyanides contained therein.

The ozone treatment zone preferably comprises a tank or reactor having an inlet and outlet for influent introduction and treated effluent withdrawal, respectively. The tank or reactor also has a gas outlet at the top thereof for withdrawal of expended ozone-containing gas.

This high mass transfer of ozone to influent is accomplished by employing a gas injector associated with the ozone treatment zone which comprises a cylindrical casing extending into the zone having an enlarged section at its lower end comprising a pair of opposed shroud members. Between the shroud members is an elongated annular gap to allow the gas-liquid mixture to pass from the casing into the zone. A shaft is rotatably mounted within the casing coupled to a means for rotating the shaft such as an electric motor. The shaft has a turbine blade impeller rotor mounted on its lower end which impeller extends into the enlarged section. By rotating the shaft, cyanide-containing wastewater influent is drawn into the water intake of the spinning impeller at the bottom of the casing while ozone-containing gas is drawn into the casing via a gas inlet tube communicating with the inside of the casing just above the enlarged section. The gas is mixed with influent expelled by the high speed impeller thus breaking the gas into small bubbles which exit the injector through the elongated gap in the form of a mixture of bubbles and influent.

A wastewater influent line can also be directly connected to the bottom of the injector in the contact zone for maximum cyanide destruction with maximum ozone transfer. This is especially preferred for use in the first ozone treatment zone as will be described in more detail below.

Such turbine gas injectors as described above have been used heretofore in bio-oxidative treatments of non-cyanide containing liquors but their use for treating cyanide-containing wastewaters has not been described heretofore.

The ozone-containing gas used to treat the wastewater can be an ozone-air, ozone-oxygen or ozone-air and oxygen mixture as prepared by conventional ozone generators. Such ozone generators are capable of producing gas mixtures from an air source containing from about 1.0% to 3.5% ozone by weight. From an oxygen source such generators produce ozone-in-oxygen or ozone-in-air and oxygen gas mixtures containing from 2.5% to 7.5% ozone by weight.

The process of this invention can be used to destroy high cyanide-containing effluents containing 100 p.p.m. total cyanide or more, medium cyanide concentrations of 50 to 100 p.p.m. total cyanide as well as low cyanide-containing effluents, i.e. containing 50 p.p.m. total cyanide or less.

Although substantial amounts of total cyanide-containing species can be destroyed by using one contact zone equipped with a turbine gas injector, it is preferred to employ at least a two stage method comprising;

(a) introducing a cyanide-containing liquid influent into a first ozone-contacting zone;

(b) contacting said influent in said first zone with a second ozone-containing gas, at least a portion of said second-ozone-containing gas comprising a first ozone-depleted gas withdrawn from a second contact zone, to form a first cyanide depleted effluent and a second ozone-depleted gas;

(c) introducing said cyanide-depleted effluent into a second ozone-contacting zone;

(d) contacting said effluent in said second zone with a first ozone-containing gas to form a second cyanide-depleted effluent and a first ozone-depleted gas.

Substantially complete ozone utilization is accomplished by one of two methods, i.e., either all fresh ozone-containing gas from an ozone source is introduced into the second zone and the exhaust gas therefrom is introduced into the first zone, or, a fraction of fresh ozone-containing gas is introduced into the second zone, the exhaust gases therefrom are combined with the balance of fresh ozone-containing gas from the source and the so combined ozone fractions are then introduced into the first zone.

Wastewater flow optimization can be obtained by withdrawing a portion of the treated effluent wastewater from the first and/or second zones and recycling it to the influent or to the first zone directly. In the case of a single-stage treatment a portion of treated effluent can be recycled from the single ozone contacting zone to incoming influent or to the zone directly. This flow scheme will reduce the amount of total cyanide that must be treated in the first stage and will also allow ozone to react with some of the cyanate contained and/or formed in the first and second stages. Residual oxidants in the treated effluent such as ozone, peroxide or oxygen species and metallic oxides are also mixed with the raw cyanide-containing influent by recycling, thereby rendering them effective for the oxidation of total cyanides and cyanates. Moreover, the total ozone gas-to-liquid ratio can be decreased by recycling thereby increasing the system efficiency. It has also been found that 90% of the total copper and complexed iron and 100% of the total zinc in the wastewater are oxidized in the process to insoluble and settable solids which can be removed by filtering or settling after one or the other stage which substantially reduces the total metals, total cyanide and cyanide amenable to chlorine in the wastewater. This can be accomplished without a pH adjustment.

Cyanate destruction in the wastewater effluents from the first or second stages can be achieved by retaining the effluents in holding zones or tanks before further treatment with ozone by recycling. This allows cyanate to react with residual oxidants to form gaseous carbon dioxide and nitrogen. As previously mentioned, reaction of cyanate to gaseous carbon dioxide and nitrogen is kinetically controlled and requires extended contact periods to go to completion. In the case of a single stage treatment a single holding zone is employed after treatment in the zone.

Three or more additional contacting zones are preferably used for cyanate destruction, the number of contacting zones depends on the initial concentration of cyanate and the desired level of cyanate in the effluents. More contacting zones offer higher utilization of ozone, particularly when low effluent concentrations of cyanate are required.

Wastewater flow for cyanate destruction, like cyanide destruction, is from the earlier zones to the latter zones with counter current ozone-containing gas flow from the latter stages to the earlier stages, at least a portion of the ozone-depleted gas from a latter stage being used as the ozone-containing gas for the next earlier stage with the remaining portion of ozone-containing gas, if any, being supplied by the ozone source.

DETAILED DESCRIPTION OF THE PREFERRED EMBODIMENTS

Figure 1:
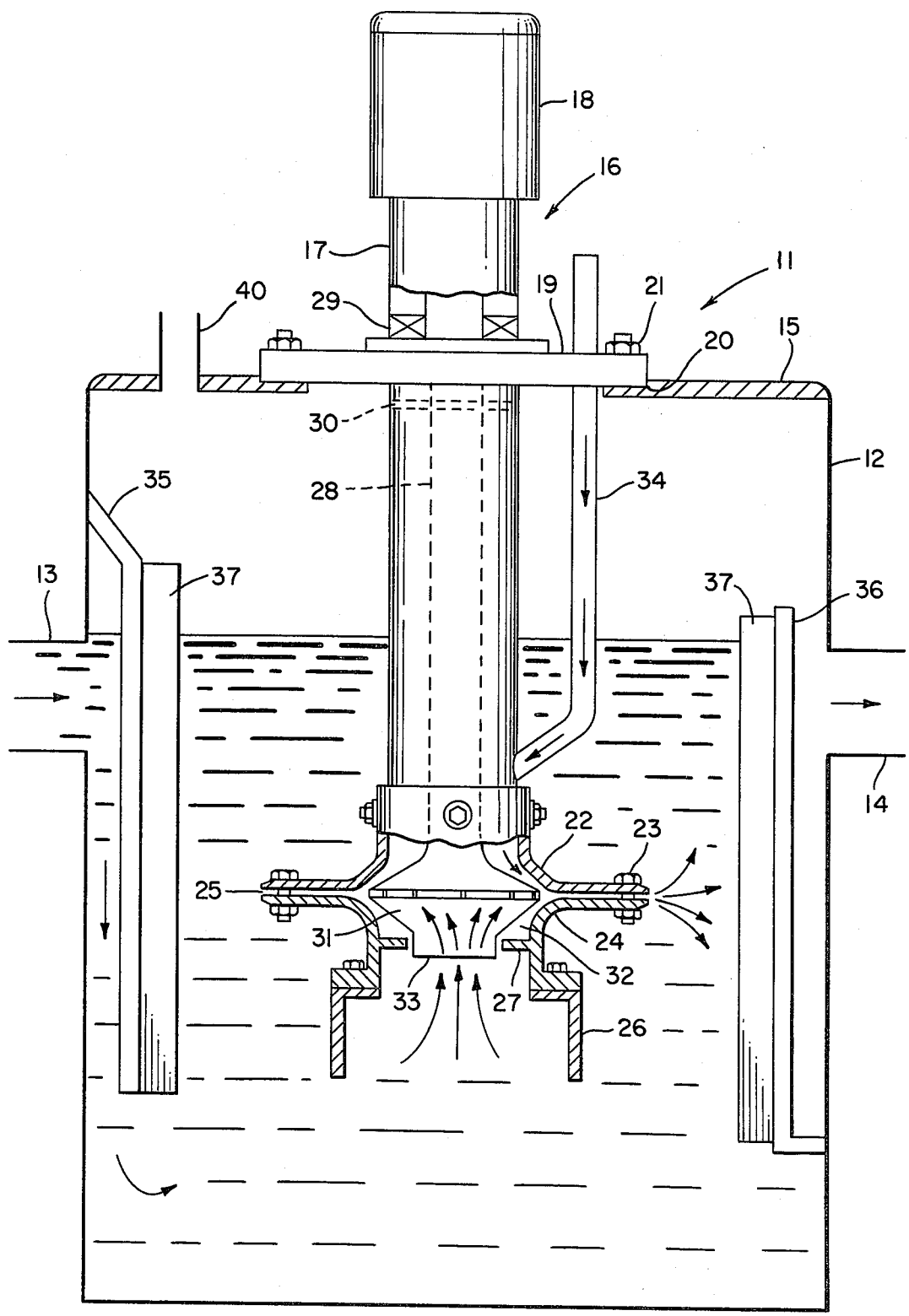
FIG. 1 is a front view of a reactor for treating cyanide-containing wastewater influents according to this invention having associated therewith a turbine gas injector which effects high mass transfer of ozone to influent.

FIG. 1 shows a reactor containing a turbine gas injector used to effect high mass transfer of ozone to cyanide-containing influent in the process of this invention. Such turbine gas injectors are manufactured by the Kerag Co. of Richterswil, Switzerland and are sold in the United States by the T.I.I. Corp. of Lindenhurst, N.Y.

The reactor is shown generally by 11 and consists of a cylindrical tank 12 having a water inlet 13 and a water outlet 14 at opposing sides thereof. Mounted atop the tank 12 and extending through the top wall 15 thereof is an electric motor driven turbine gas injector shown generally by 16.

The injector 16 comprises a hollow cylindrical casing 17 mounted under electric motor 18 and extends into the tank through the top. The casing 17 is secured to the upper wall 15 of the tank by collar 19 which sits in an annular recess 20 in the top wall and is secured therein by means of bolts 21. Bolted to the outside of the casing at its lower end is upper shroud member 22 which flares outwardly from the casing. Mounted below the upper shroud member 22 by means of bolts 23 is lower shroud member 24 which is, for the most part, a mirror image of upper shroud member 22. The upper and lower shroud members together form an outwardly flaring collar or enlarged section at the bottom of the casing. There is a small annular, elongated gap 25 between the flared ends of the shroud members which can be varied by adjusting bolts 23. The upper shroud member 22 and lower shroud member 24 form internal chamber 32. The lower end of the lower shroud member 24 is flanged and is bolted to the flanged end of water intake section 26. An inwardly protruding section 27 at the lower inner section of the lower shroud member 24 defines an annular space to accommodate impeller intake section 33 which will be described in more detail below.

Rotatably mounted inside the casing 17 is shaft 28 which is coupled to motor 18 and extends to the lower end of the casing. The shaft is rotatably supported by bearing 29 in the casing at top wall 15. A seal 30 located just below the top wall in the casing prevents ozone and other gases from reaching the bearing and motor. Mounted at the lower end of shaft 28 is turbine-bladed impeller rotor 31 which fits closely within chamber 32. The water intake end 33 of the impeller is nested within the annular space defined by section 27.

A gas inlet line 34 extends from the top of the tank 12, through collar 20 and joins the casing 17 above shroud collar 22. A gas outlet 40 is located in the top of the tank.

The tank 12 is also equipped with water guide baffle 35 near water inlet 13 which baffle directs water flow to the inlet section 26 of the injector. An overflow weir 36 is mounted inside the tank near outlet 14 to control liquid level in the tank. Mounted on the water guide baffle 35 and overflow weir 36 are baffle fins 37 which prevent liquid in the tank from developing a vortex during operation of the injector. Additional fins are equally spaced around the inside of the tank (not shown). In operation of the tank and injector of FIG. 1, cyanide-containing influent is introduced to the tank through inlet 13 and around guide baffle 35 to a level indicated in the Figure. The motor 27 is energized and rotates shaft 28 and impeller 31 at high speed while ozone-containing gas from an external supply is connected with gas inlet 34. A portion of the influent in the tank is drawn into the intake 33 of the spinning impeller 31 while at the same time ozone-containing gas is drawn into the casing 17 where it is mixed with influent expelled from the high speed impeller in the space between the impeller and elongated gap to impart a high velocity to the influent stream and to break the gas into small bubbles. The liquid stream and gas mixture are injected through the elongated gap 25 into the mass of influent liquid in the tank as shown by the arrows. Momentarily, as the gas-water vortex action is slowed by the mass of liquid in the influent plenum volume, the gas velocity pressure is converted into high static pressure in contact with the extended surface interface of the water and accomplishes a high mass transfer of ozone to liquid in the tank. Since the impeller 31 draws in the gas stream, the gas line to the tank is under negative pressure, thereby reducing the possibility of gas leakage into the ambient environment.

The bubble size of the injected gas depends upon a number of parameters including the speed or r.p.m. of the impeller, the width of the elongated gap 25, the ozone-containing gas to liquid influent ratio, the viscosity of the influent, the temperature of the influent and the static pressure head of liquid influent in the tank. By adjusting these parameters such bubble sizes can be controlled to between about $\frac{1}{2}$ mm. to about 60 mm. in diameter and preferably from about $\frac{1}{2}$ mm. to 5 mm. for optimum mass transfer conditions.

After treatment in the injector, treated effluent is withdrawn from the tank through outlet 14. Expended ozone-containing gas is withdrawn from the tank through gas outlet 40.

Figure 2:
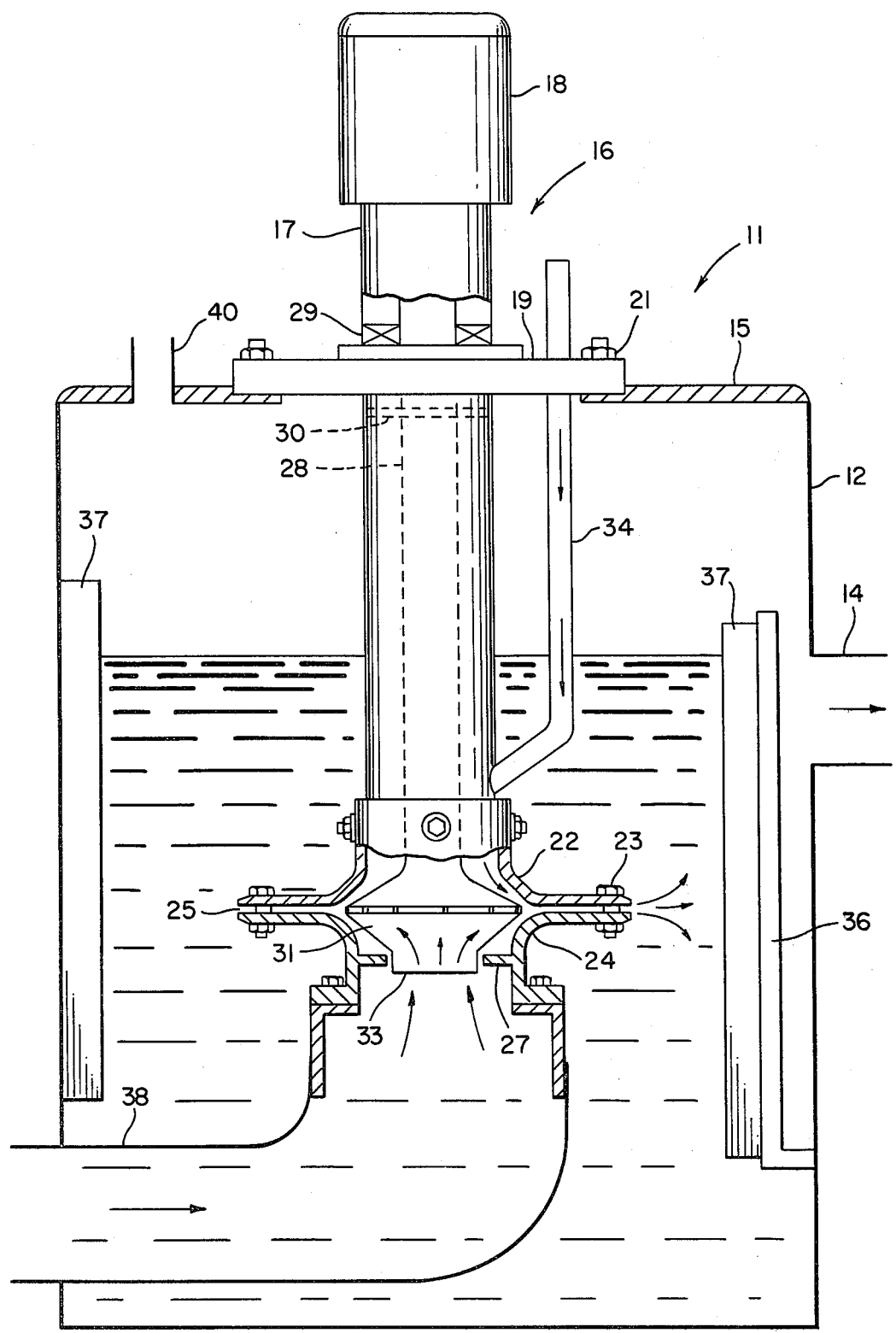
FIG. 2 is a front view of a reactor having associated therewith a turbine gas injector wherein the influent line to said reactor is directly connected to said gas injector.

FIG. 2 shows an alternative construction of the tank 12 wherein wastewater influent is connected directly to the bottom of the injector 16. In this construction, influent line 38 enters through the side wall of tank 12 where it is bolted to shroud member 24. Inlet 13 and guide baffle 35 as shown in FIG. 1 are eliminated and fin 37 is mounted on the wall of tank 12. This construction allows all wastewater influent to be fed directly to the injector 16. It has been found that such a construction is desirable for the first stage of ozone treatment in the multi-stage embodiment of this invention whereas the construction used in FIG. 1 is preferred for the second or latter stages.

Figure 3:
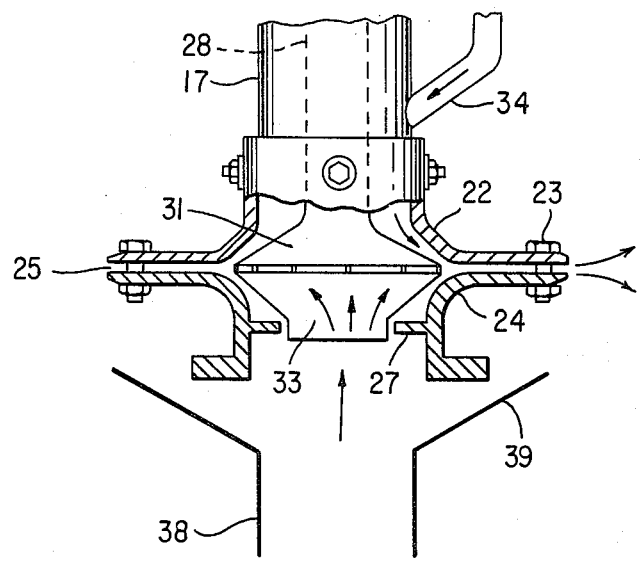
FIG. 3 is a sectional view of a "fail-safe" modification of FIG. 2.

FIG. 3 is a sectional view of a fail-safe embodiment of FIG. 2 showing only the lower portion of injector 16. In this embodiment, the wastewater influent line 38 is not directly connected with the bottom of the injector but flares outwardly in an inverted frustro-conical shape 39 a short distance below shroud member 24. Such construction prevents excessive pressure on the impeller 31 at high flow rates of influent thus preventing damage to the impeller and motor. Excessive pressure is relieved by letting a portion of the influent escape into the tank between the edge of the flared section 39 and the bottom of the injector. During underflow conditions, wastewater from the tank is drawn into the frustro-conical shape 39 for turbine optimization.

Figure 4:
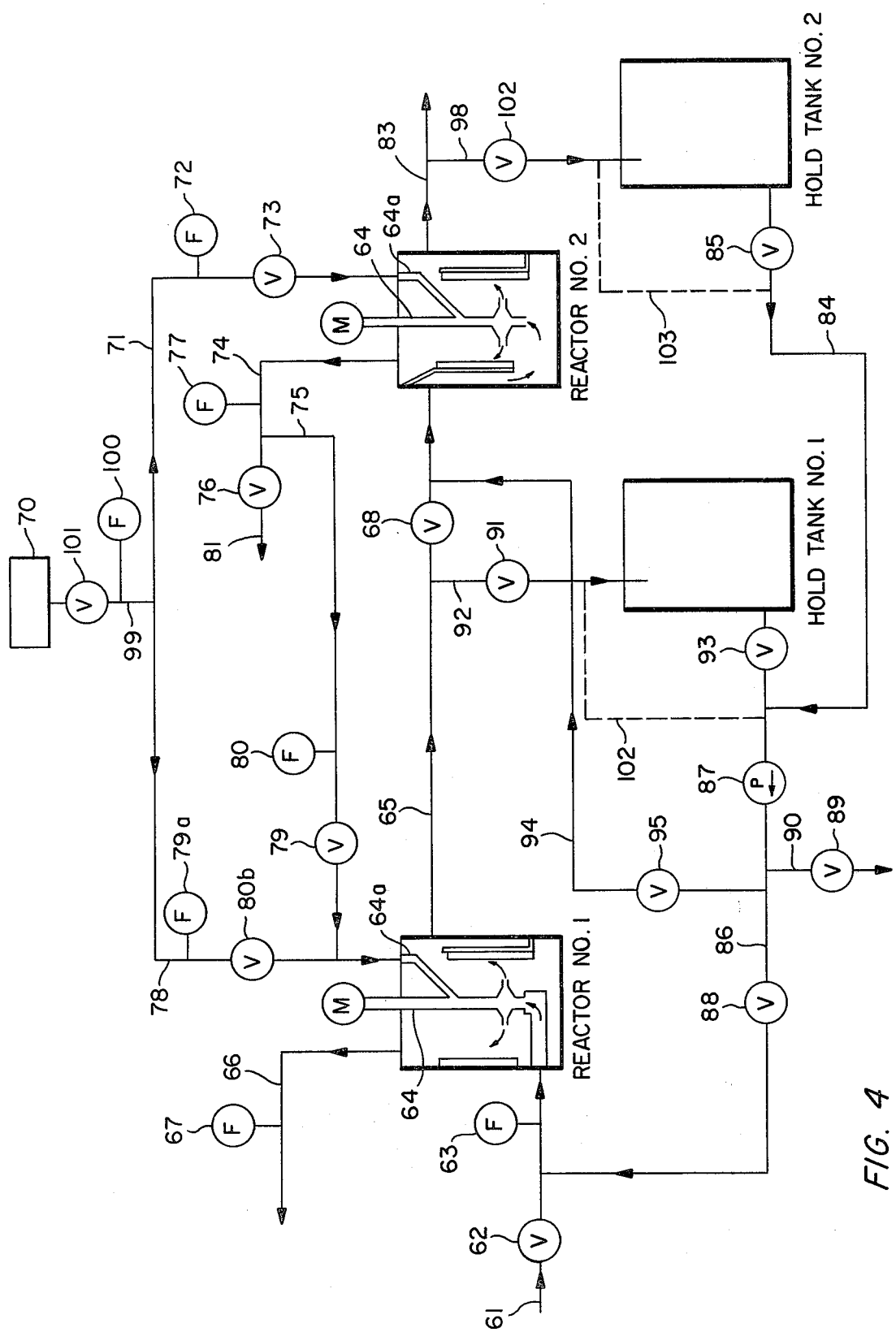
FIG. 4 is a flow diagram of the process embodiments of this invention.

FIG. 4 is a flow diagram of process embodiments of this invention which includes;

A. A single-stage ozone treatment;
B. A single-stage ozone treatment with recycling of treated effluent to influent;
C. A double-stage ozone treatment; and
D. A double-stage ozone treatment with recycling of treated effluent to influent.

Ozone-containing gas flow in the single-stage ozone treatments is from an ozone-containing gas generating source directly to the stage or zone containing water to be treated, with the exhaust or expended gas being discharged from the system. In the case of the double-stage ozone treatments, either all ozone-containing gas may be introduced into the second stage and the exhaust gas withdrawn therefrom introduced as the ozone-containing gas to the first stage or a portion of the total flow of ozone-containing gas may be introduced into the second stage, the exhaust therefrom combined with the remaining portion of ozone-containing gas and the combined gases introduced as the ozone-containing gas to the first stage.

A. SINGLE-STAGE OZONE TREATMENT

Referring to FIG. 4, cyanide-containing wastewater influent enters the system in line 61 where it is directly introduced to the bottom of an operating turbine gas injector 64 as shown in FIG. 2 which is housed in Reactor No. 1. Valve 62 in conjunction with flowmeter 63 regulate wastewater influent flow to Reactor No. 1.

Connected to the gas inlet 64a of the injector is line 78 which conducts ozone-containing gas generated in ozone generator 70. Flowmeter 79a and valve 80b are used to measure and control flow through line 78.

Such ozone-containing gas can be an ozone-air, ozone-oxygen or ozone-air and oxygen mixture wherein the ozone comprises for example from about 1.0% to 3.5% by weight of the mixture when using an air feed to the ozone generator. About a 2% by weight ozone-in-air mixture is preferred. Through the high rotational speed of the impeller in the injector 64, the influent is fed into the impeller and mixed with ozone-containing gas drawn into the casing of the injector to form a mixture of very fine bubbles of ozone in the influent.

After the ozone-containing gas and wastewater influent mixture are distributed into the plenum volume of influent in Reactor No. 1 in the form of a mixture of fine bubbles of ozone in the influent and allowed to react, the expended ozone-containing gas from Reactor No. 1 is withdrawn therefrom in line 66. The flow through line 66 is monitored by flowmeter 67.

Treated wastewater effluent from Reactor No. 1 is withdrawn in line 65 and may be removed from the system by directing flow to Hold Tank No. 1 via line 92 and valve 91 and from the Hold Tank to line 90 via valve 93, pump 87 and valve 89. Valves 68 and 88 are closed.

The above-described Single-Stage Ozone Treatment is particularly useful for treating low cyanide-containing wastewaters ie; 50 ppm or less cyanide.

B. SINGLE-STAGE OZONE TREATMENT WITH RECYCLING OF TREATED EFFLUENTS

Alternatively, treated effluent from Reactor No. 1 in Hold Tank No. 1 may be recycled to line 61 through line 86, valves 88 and 93 and pump 87. By recycling the treated effluent in the Hold Tank, residual oxidants in the effluent are allowed to destroy additional cyanide and time is allowed for the kinetically-controlled conversion of some cyanate to carbon dioxide and nitrogen to take place.

The treated effluent from Reactor No. 1 combined with the influent feed in line 61 at about double the original flow rate are contacted with ozone-containing gas in gas injector 64 of Reactor No. 1. The recycling of treated effluent containing a reduced cyanide content to incoming influent in line 61 reduces the amount of total cyanide that must be treated in Reactor No. 1 thereby allowing a portion of the ozone-containing gas to react with cyanate in the influent. Additional unreacted oxidants in the treated effluent are also mixed with the raw cyanide-containing wastewater thereby rendering them effective for the oxidation of total cyanide and cyanate. The recycling also reduces the ozone-containing gas-to-liquid influent ratio since less cyanide must be treated thereby rendering the process more efficient.

After treatment in Reactor No. 1, treated recycled and raw wastewater may be separated from the system in line 90 as mentioned above in connection with the single-stage ozone treatment.

C. DOUBLE-STAGE OZONE TREATMENT

The wastewater flow in Reactor No. 1 of the double-stage ozone treatment is the same as in the single-stage treatment except that the ozone-containing gas introduced into the gas inlet 64a of Reactor No. 1 comprises at least a portion of the expended ozone-containing gas withdrawn from Reactor No. 2 which will be described in more detail hereafter.

Treated wastewater effluent from Reactor No. 1 is withdrawn in line 65 and enters Reactor No. 2 by opening valve 68. As shown in FIG. 1, the effluent enters Reactor No. 2 at the water inlet in the side of the Reactor. A portion of the effluent is then drawn up the water inlet of turbine gas injector 64 in Reactor No. 2. Line 65 may also be directly connected to the bottom of turbine gas injector 64 as in Reactor No. 1. (see FIG. 2)

Treated effluent from Reactor No. 2 is withdrawn in line 83 where it can be separated from the system by closing valve 102 in line 98.

The ozone-containing gas generated in ozone generator 70 is introduced into Reactor No. 1 and No. 2 by either of the following schemes.

In one scheme, all ozone-containing gas from generator 70 is introduced into the gas inlet 64a of turbine gas injector 64 of Reactor No. 2 via line 99 and 71, through valves 73 and 101. Flowmeter 100 in line 99 and flowmeter 72 in line 71 monitor gas flow. After contacting and reacting with the influent in Reactor No. 2, the ozone-depleted gas is withdrawn in line 74 monitored by flowmeter 77 and enters line 75 when valve 76 is in the closed position. The ozone-depleted gas in line 75 connects with line 78 via valve 79 and flowmeter 80 to the gas inlet 64a of turbine injector 64 of Reactor No. 1. This scheme is preferred for low cyanide-containing influents.

In the second scheme, which is preferred for high cyanide-containing influents, a portion of ozone-containing gas from ozone generator 70, e.g. from 1% to 99%, preferably 50%±10% of the total, may be introduced into the turbine gas injector of Reactor No. 2 through line 71 and the remaining portion introduced into line 78 where it is combined with ozone-depleted gas exhausted from Reactor No. 2 in line 75. The ozone concentration of the ozone-depleted gas determines whether or not it is reused in Reactor No. 1. This offers maximum flexibility in operating the system for variations in cyanide concentrations in the influent. A portion of the ozone-depleted gas from Reactor No. 2 may also be withdrawn from the system through line 81.

D. DOUBLE-STAGE OZONE TREATMENT WITH RECYCLING OF TREATED EFFLUENT

Treated effluent from Reactor No. 2 can also be withdrawn through line 98 where it is introduced into Hold Tank No. 2. If desired, the effluent may be retained in the Hold Tank for from about 5 to 15 minutes to allow residual oxidants to destroy cyanide and some cyanate.

The effluent is withdrawn from Hold Tank No. 2 in line 84 through valve 85 where it enters line 86 and is introduced to wastewater influent line 61 by pump 87 through valve 88. Raw wastewater influent and recycled effluent are then introduced to Reactor No. 1. A portion of the recycled effluent in line 86 may be dumped via line 90 by opening valve 89.

Hold Tank No. 1 may also be employed to accept treated effluent from Reactor No. 1 by closing valve 68 and opening valve 91 in line 92. Treated effluent in Hold Tank No. 1 may then be withdrawn to line 86 where it is combined with treated effluent from line 84. If desired, treated effluents in Reactors No. 1 or No. 2 need not be retained in any Hold Tanks but may be directly recycled to influent line 61 as indicated by dotted lines 102 and 103.

A portion of treated effluent in line 86 may also be recycled to Reactor No. 2 in lines 94 and 65 by opening valve 95 and closing valves 88 and 89. The advantages of recycling have been discussed above in connection with the single-stage treatment with recycling of treated effluent.

It has been found that by employing a single-stage ozone treatment with no recycling, about 80% to 90% of the total cyanide in the original wastewater influent can be destroyed rapidly i.e. in less than 10 minutes. In the case of single-stage treatment with recycling, even greater amounts of total cyanide in the treated recycle effluents are destroyed as well as significant amounts of cyanide in the combined raw influent. Significant amounts of additional cyanate are also destroyed in the case of the double-stage reaction with no recycling.

In the double-stage treatment with recycling of treated effluent, even greater amounts of cyanide and cyanate are destroyed.

It has also been found that the ozonation treatment according to this invention also oxidizes simple and complexed metals in the cyanide-containing wastewater to form a precipitate. This precipitate can be filtered or settled to remove the metals as well as reduce further the total cyanide in the wastewater influent. For example, in the case of a cyanide-containing influent also containing small amounts of copper, iron and zinc, free and complexed with cyanide species, about 90% of the copper and complexed iron and about 100% of the zinc can be removed in the second stage of a double-stage ozone treatment, with or without recycling of effluent.

It has also been found that by regulating the ozone flow in the double-stage process according to the schemes outlined above, 100% ozone utilization can be achieved by controlling gas to liquid ratios for specific cyanide influent concentrations.

Figure 5:
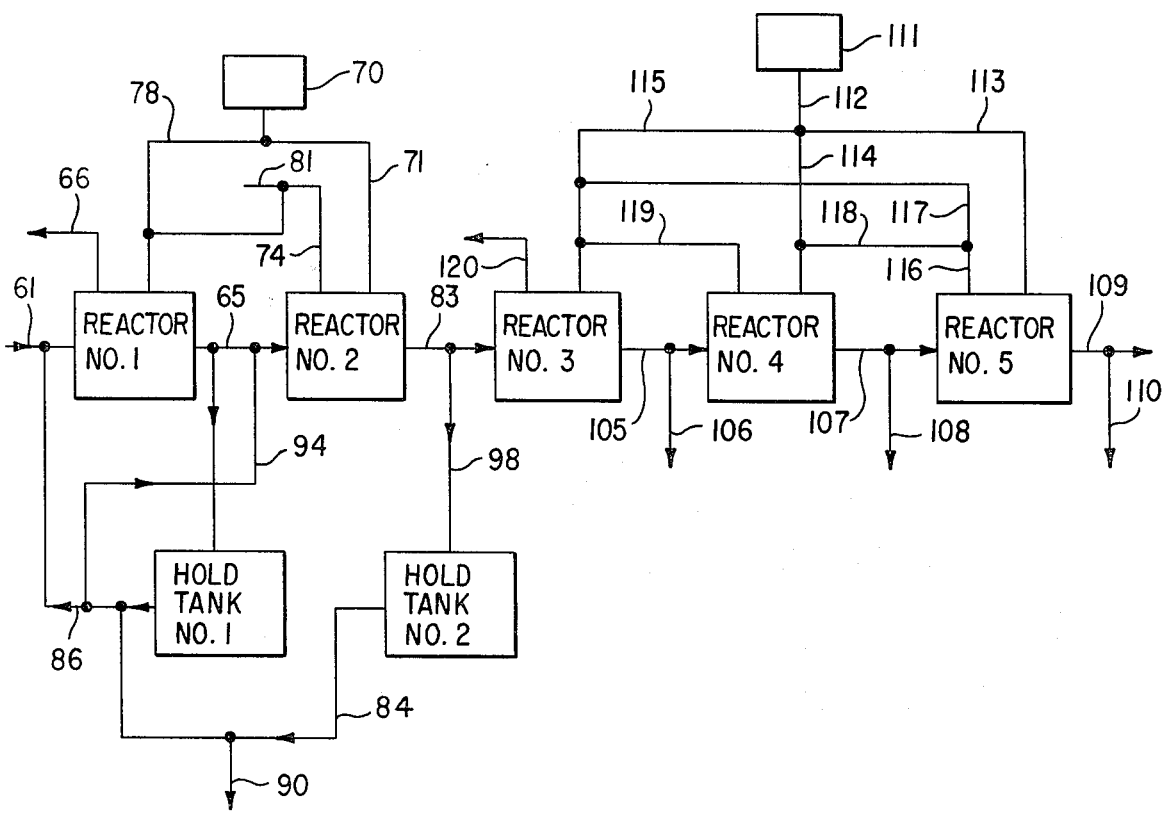
FIG. 5 is a process block diagram which includes the processes of FIG. 4 and also a cyanate destruction process.

FIG. 5 is a block diagram of a process for substantially destroying cyanate contained in a cyanide-depleted effluent stream such as that discharged from line 83 of FIG. 4. Such effluent contains substantial amounts of cyanate derived from cyanate originally present in the wastewater influent stream in line 61 and from cyanate formed by the initial oxidation of cyanides in Reactors No. 1 and No. 2 by any of the methods hereinbefore discussed.

The left portion of FIG. 5 is essentially a repetition of FIG. 4 in block diagram form showing only essential wastewater lines, ozone-containing gas lines, Hold Tanks and Reactors. The right portion of FIG. 5 is a block diagram of a cyanate destruction process.

Effluent from line 83 enters the first reactor, Reactor No. 3, of a multi-reactor system comprising Reactors No. 3, 4 and 5, each of which reactors may be similar in construction to Reactors No. 1 and No. 2. However, since the oxidation of cyanate to nitrogen and carbon dioxide is kinetically and not mass transfer controlled it is unnecessary to employ turbine gas injectors as in Reactors No. 1 and No. 2, although such injectors may be employed, if desired. Conventional ozone ejectors or diffusers are also satisfactory. Effluent in Reactor No. 3 is reacted with an ozone-containing gas and withdrawn in line 105 where it may be discharged in line 106 if desired, depending on the levels of cyanate destroyed in the effluent. Preferably, however, the effluent in line 105 is introduced into Reactor No. 4 where it is again treated with an ozone-containing gas and withdrawn in line 107. The effluent may be discharged in line 108 depending on the desired degree of cyanate destruction or introduced into Reactor No. 5. After ozone treatment in Reactor No. 5, the treated effluent is withdrawn in line 109 where it is either removed from the system in line 110 or sent to further ozone reactors (not shown), if necessary, to further deplete cyanate.

The ozone distribution system in the cyanate destruction process of FIG. 5 is similar to the system for destroying cyanide. An oxone-containing gas source such as an ozone-air, ozone-oxygen or ozone-air and oxygen gas generator as indicated by 111, introduces ozone-containing gas to each Reactor by one or the other of the following methods.

In the first method, a portion of ozone-containing gas is introduced into one or more of the later reactors and the exhaust gases therefrom combined with the remaining portions of ozone-containing gas being introduced to one or more earlier zones. For example, an ozone-containing gas in line 112 may be introduced into each of Reactors 3, 4 or 5 through lines 113, 114 and 115, respectively (eg ⅓ to each). Exhaust ozone-containing gas from Reactor No. 5 in line 116 is added to fresh ozone-containing gas in lines 114 and/or 115 through lines 117 and 118, respectively. Exhaust ozone-containing gas from Reactor No. 4 is withdrawn in line 119 and combined with ozone-containing gas in line 115 to Reactor No. 3. Exhaust ozone-containing gas from Reactor No. 3 is removed from the system in line 120. A similar procedure is used for two contacting zones as in the cyanide-destruction method.

In the second method all ozone-containing gas is introduced to a later zone and the exhaust therefrom used as the ozone-containing gas to be introduced to an earlier zone. For example, ozone-containing gas in line 112 is introduced into Reactor No. 5 via line 113, the exhaust gas therefrom in line 116 introduced into Reactor No. 4 through lines 118 and 114, and the exhaust gas from Reactor No. 4 in line 119 introduced into Reactor No. 3 through line 115. Exhaust ozone-containing gas is removed from the system in line 120. If two reactors are used, all ozone-containing gas is introduced into Reactor No. 4 and the exhaust therefrom used in Reactor No. 3.

Although the ozone source 70 for Reactors No. 1 and No. 2 is shown in FIG. 5 as being separate from ozone source 111, it is within the scope of this invention to provide a single ozone source to serve all Reactors shown in FIG. 5.

Since the conversion of cyanate to nitrogen and carbon dioxide is kinetically controlled, it is necessary that a cyanate-containing influent be contacted with ozone for longer periods of time to destroy cyanates than for cyanide destruction.

Experimentally it has been determined that 50% of all cyanate can be destroyed using one reactor e.g. Reactor No. 3, after about 30 minutes of contact time with an ozone-containing gas and about 70% to 75% can be destroyed within 60 or 90 minutes. Ozone utilization is from about 50% to 60% of the dose when continuously introduced to the reactor. If two cyanate-destruction reactors are employed, e.g. Reactors No. 3 and No. 4, with all ozone-containing gas introduced to Reactor No. 4 and the exhaust gas therefrom introduced to Reactor No. 3, from 50% to 65% of the cyanate can be destroyed within 20 to 30 minutes and from 82% to 86% can be destroyed within 60 minutes. Ozone utilization is as high as 75% during the first 30 minutes.

It has been estimated that about 90% or greater of the cyanate contained in the effluent in line 83 can be destroyed within about 20 to 30 minutes using three stages as described above and that even more cyanate can be destroyed by using additional ozone-contacting zones.

EXAMPLES 1 TO 4

These Examples illustrate a Double-stage Ozone Treatment of a low cyanide-containing wastewater stream as illustrated in FIG. 4 wherein the wastewater stream in line 61 is first introduced into Reactor No. 1, then to Reactor No. 2 and finally withdrawn in line 83. The reaction time in each Reactor was about 5 minutes for each Example.

In Examples 1 to 3 the total cyanide concentration ($CN_T$) of each influent stream was 46.9 mg/l, the cyanide amenable to chlorine oxidation ($CN_{Am-Cl}$) was 43.9 mg/l, the free cyanide concentration ($CN_F$) was 19.3 mg/l and the cyanate concentration (CNO) was 9.6 mg/l. In Example 4 the $CN_T$ was 44.6 mg/l the $CN_{Am-Cl}$ was 40.1 mg/l, the $CN_F$ was 17.5 mg/l and the CNO was 6.6 mg/l. The pH of each influent was between 9.5 and 9.7.

The total copper and iron contents were about 21.5 and 1.3 mg/l, respectively, for all Examples and the total zinc content was about 0.3 mg/l.

The ozone-containing gas employed was a 2.3 wt. % ozone in-air mixture for Examples 1 to 3 and a 1.6% wt. % ozone-in air mixture for Example 4.

In Example 1, 100% of the fresh ozone-containing gas generated in generator 70 was introduced into Reactor No. 2 with the exhaust gas therefrom introduced as the ozone-containing gas to Reactor No. 1.

In Example 2, 40% of the fresh ozone-containing gas was directed to Reactor No. 2 and the exhaust therefrom was mixed with 60% of fresh ozone-containing gas introduced to Reactor No. 1.

Example 3 employed the same ozone gas flow as Example 2 except that the wastewater flow through Reactors 1 and 2 were doubled, i.e. from 3 G.P.M. to 6 G.P.M. (gallons per minute) or 11.34 l/min. to 22.68 l.p.m. (liters per minute).

Example 4 was also identical to Example 2 except that the ozone concentration was reduced.

Table 1 below lists the relevant parameters of the process in each Reactor ($R_1$ and $R_2$).

Table 2 summarizes the over-all process parameters of Table 1 for the system.

TABLE 1

| | EXAMPLE | | | | | | | |
|---|---|---|---|---|---|---|---|---|
| | 1 | | 2 | | 3 | | 4 | |
| PARAMETER | R1 | R2 | R1 | R2 | R1 | R2 | R1 | R2 |
| $CN_T$ | | | | | | | | |

TABLE 1-continued

| PARAMETER | | EXAMPLE | | | | | | | |
|---|---|---|---|---|---|---|---|---|---|
| | | 1 | | 2 | | 3 | | 4 | |
| | | R1 | R2 | R1 | R2 | R1 | R2 | R1 | R2 |
| Influent | mg/l | 46.9 | 26.5 | 46.9 | 2.1 | 46.9 | 27.4 | 44.6 | 5.3 |
| Effluent | mg/l | 26.5 | 3.5 | 2.1 | 5.5 | 27.4 | 4.7 | 5.3 | 3.5 |
| Reduction | mg/l | 20.4 | 23.0 | 44.8 | +3.4 | 19.5 | 22.7 | 39.3 | 1.8 |
| Flow | l/min. | 11.34 | 11.34 | 11.34 | 11.34 | 22.68 | 22.68 | 11.34 | 11.34 |
| Reduction | mg/min. | 231.3 | 260.8 | 508.0 | +38.6 | 442.3 | 514.8 | 445.7 | 20.40 |
| $O_3$ | | | | | | | | | |
| $O_3$Conc | wt % | 0.6 | 2.3 | 1.6 | 2.3 | 1.5 | 2.3 | 1.3 | 1.6 |
| Flow in | m³/hour | 4.17 | 3.83 | 4.35 | 0.08 | 4.35 | 0.08 | 5.58 | 2.38 |
| Dose | mg/min. | 520 | 1700 | 1430 | 40 | 1270 | 40 | 1470 | 750 |
| Used | mg/min. | 520 | 1260 | 1300 | 30 | 1250 | 40 | 1250 | 610 |
| $O_3/CN_T$ | | | | | | | | | |
| Dose | mg/mg | 2.3 | 6.5 | 2.8 | — | 2.9 | 0.1 | 3.3 | 36.8 |
| Used | mg/mg | 2.3 | 4.8 | 2.6 | — | 2.8 | 0.1 | 2.8 | 29.9 |
| CNO | | | | | | | | | |
| Influent | mg/l | 9.6 | 43.7 | 9.6 | 68.4 | 9.6 | 54.4 | 6.6 | 45.5 |
| Effluent | mg/l | 43.7 | 54.6 | 68.4 | 61.0 | 54.4 | 63.5 | 45.5 | 33.2 |
| Increase | mg/l | 34.1 | 10.9 | 58.8 | −7.4 | 44.8 | 9.1 | 38.9 | −12.3 |
| Increase | mg/l | 386.7 | 123.6 | 666.8 | −83.9 | 1016.1 | 206.4 | 441.1 | −139.5 |
| $CNO/CN_T$ | | | | | | | | | |
| | mg/mg | 1.7 | 0.5 | 1.3 | −2.2 | 2.3 | 0.4 | 1.0 | −6.3 |
| G/L ratio[1] | | 6.1 | 5.6 | 6.4 | 0.1 | 3.2 | 0.1 | 8.2 | 3.5 |

[1] Gas to Liquid ratio

TABLE 2

| PARAMETER | | EXAMPLE | | | |
|---|---|---|---|---|---|
| | | 1 | 2 | 3 | 4 |
| $CN_T$ | | | | | |
| Reduction | mg/min. | 492.1 | 469.4 | 957.1 | 466.1 |
| $O_3$ | | | | | |
| Dose | mg/min. | 1700 | 1700 | 1700 | 1800 |
| Used | mg/min. | 1700 | 1570 | 1680 | 1580 |
| % $O_3$reacted | | 100 | 92.87 | 99.0 | 87.5 |
| $O_3/CN_T$ | | | | | |
| Dose | mg/mg | 3.5 | 3.6 | 1.8 | 3.9 |
| Used | mg/mg | 3.5 | 3.3 | 1.8 | 3.4 |
| CNO | | | | | |
| Increase | mg/mg | 510.3 | 582.9 | 1222.5 | 301.6 |
| $CNO/CN_T$ | | | | | |
| | mg/mg | 1.0 | 1.2 | 1.3 | 0.6 |
| G/L ratio | | 5.6 | — | — | — |

Ozone utilization as indicated by the % $O_3$ reacted in Table 2 was about 100% for Examples 1 and 3 while Examples 2 and 4 show excellent but somewhat lower efficiencies. Example 4 had the highest gas to liquid ratio (G/L ratio) while Example 3 had the lowest. Although the ozone data for Examples 2 and 3 show a low amount of ozone being introduced to Reactor No. 2, the cyanide reduction (22.7 mg/l for Ex. 3) indicates a greater amount of ozone being injected than the data indicates. However, the overall system efficiency of ozone utilization to total cyanide reduction ($O_3/CN_T$) was excellent for Example 3. Examples 1 and 4 resulted in maximum $CN_T$ removal leaving only iron complexed cyanides in the effluent from Reactor No. 2. The $O_3/CN_T$ ratio was 3.5 (dose and used) for Example No. 1 and since the $CNO/CN_T$ ratio was much lower in Reactor No. 2 of Example 1, some of the ozone was used for CNO degradation (Table 1). Reactor 1 was very efficient with respect to $O_3/CN_T$ ratios less than 3.0 for all Examples (except No. 4) which is due to the high mass transfer of ozone to the wastewater stream. Example 4 had the lowest ozone concentration in the gas stream. The higher flow rate for Example 3 was the most efficient system requiring only 1.8 mg $O_3$ dosed/mg $CN_T$ reduced both for dose and used ozone rates (Table 2). All Examples also showed substantially complete removal of free cyanide and cyanide amenable to chlorine oxidation; pH values of the stream did not change significantly for all Examples.

With regard to the metal contents in the influents of each Example, it was found that a 90% reduction in soluble iron was achieved in Examples 1 and 2 with somewhat less reduction in the other Examples, all of which reductions were evidenced by the formation of an Fe-CN complex precipitate. In Example 3 all Fe-CN complexes remained in solution due to the increased flow rate. A 90% soluble copper reduction was obtained in Examples 1 and 2 with less reductions in the other test runs. In most cases soluble zinc was also completely precipitated. Color and turbidity increased with the addition of ozone due to the precipitation of the metals; higher turbidity always being obtained after the second ozone injection ($R_2$). The highest turbidity readings were associated with Examples 1 and 2 which indicated that turbidity values could be used to predict the degree of metal precipitation.

EXAMPLES 5 TO 8

These Examples illustrate a Double-Stage Ozone Treatment of a high cyanide-containing wastewater stream following the procedure of Examples 1 to 4, respectively.

In Examples 5 to 7, the $CN_T$ was 95.5 mg/l, the $CN_{Am-Cl}$ was 82.3 mg/l, the $CN_F$ was 56.0 mg/l and the CNO was 11.1 mg/l. In Example 8 the $CN_T$ was 106.5 mg/l, the $CN_{Am-Cl}$ 79.5, the $CN_F$ 26.0 and the CNO 17.0 mg/l. The pH of each influent was between 10.10 and 10.20.

Total copper and iron contents in each influent were about 64 mg/l and 4.7 mg/l respectively.

The ozone-containing gas employed was a 1.69 wt.% ozone-in-air mixture (Examples 5 to 7) and a 1.49 wt.% ozone-in-air mixture (Example 8). The same ozone dose rate (3.0 gr/min) was employed for Examples 5 to 7 while a dose rate of 3.2 gr/min was employed for Example 8. To obtain sufficient ozone to react with the high $CN_T$, high G/L ratios were required for Examples 5 to 7 but Example 8 required a lower G/L ratio due to the doubled waterflow rate.

Tables 3 and 4 below summarize the relevant process parameters for each stage of each Example and for the overall system, respectively.

TABLE 3

| PARAMETER | | EXAMPLE | | | | | | | |
|---|---|---|---|---|---|---|---|---|---|
| | | 5 | | 6 | | 7 | | 8 | |
| | | R1 | R2 | R1 | R2 | R1 | R2 | R1 | R2 |
| $CN_T$ | | | | | | | | | |
| Influent | mg/l | 95.5 | 34.5 | 95.5 | 22.1 | 95.5 | 53.3 | 106.5 | 12.2 |
| Effluent | mg/l | 34.5 | 8.0 | 22.1 | 7.5 | 53.3 | 31.8 | 12.2 | 2.2 |
| Reduction | mg/l | 61.0 | 26.5 | 73.4 | 14.6 | 42.2 | 21.5 | 94.3 | 10.0 |
| Flow | l/min. | 11.34 | 11.34 | 11.34 | 11.34 | 22.68 | 22.68 | 11.34 | 11.34 |
| Reduction | mg/min. | 691.7 | 300.5 | 832.4 | 165.5 | 957.1 | 487.6 | 1069.4 | 113.4 |
| $O_3$ | | | | | | | | | |
| $O_3$Conc | wt % | 0.50 | 1.69 | 1.18 | 1.69 | 1.14 | 1.69 | 1.02 | 1.49 |
| Flow in | m³/hour | 8.84 | 8.84 | 8.84 | 3.54 | 8.84 | 5.30 | 10.63 | 4.23 |
| Dose | mg/min. | 880 | 2990 | 2090 | 1200 | 2020 | 1790 | 2170 | 1260 |
| Used | mg/min. | 880 | 2110 | 2090 | 990 | 2020 | 1790 | 2170 | 1000 |
| $O_3/CN_T$ | | | | | | | | | |
| Dose | mg/mg | 1.3 | 10.0 | 2.5 | 7.2 | 2.1 | 3.7 | 2.0 | 11.1 |
| Used | mg/mg | 1.3 | 7.0 | 2.5 | 6.0 | 2.1 | 3.7 | 2.0 | 8.8 |
| CNO | | | | | | | | | |
| Influent | mg/l | 11.1 | 96.7 | 11.1 | 114.9 | 11.1 | 67.8 | 17.0 | 157.0 |
| Effluent | mg/l | 96.7 | 93.8 | 114.9 | 124.6 | 67.8 | 112.6 | 157.0 | 177.0 |
| Increase | mg/l | 85.6 | —2.9 | 103.8 | 9.7 | 56.7 | 44.8 | 140.0 | 20.0 |
| Increase | mg/min. | 970.7 | — | 1177.1 | 110.0 | 1286.0 | 1016.1 | 1587.6 | 226.8 |
| $CNO/CN_T$ | | | | | | | | | |
| | mg/mg | 1.4 | — | 1.4 | 0.7 | 1.3 | 2.1 | 1.5 | 2.0 |
| G/L | | 13.0 | 13.0 | 13.0 | 5.2 | 6.5 | 3.9 | 15.6 | 6.2 |

TABLE 4

| PARAMETER | | EXAMPLE | | | |
|---|---|---|---|---|---|
| | | 5 | 6 | 7 | 8 |
| $CN_T$ | | | | | |
| Reduction | mg/min. | 992.2 | 998.0 | 1444.7 | 1182.8 |
| $O_3$ | | | | | |
| Dose | mg/min. | 2990 | 2990 | 2990 | 3150 |
| Used | mg/min. | 2990 | 2990 | 2990 | 3150 |
| % $O_3$ reacted | | 100 | 100 | 100 | 100 |
| $O_3/CN_T$ | | | | | |
| Dose | mg/mg | 3.0 | 3.0 | 2.1 | 2.7 |
| Used | mg/mg | 3.0 | 3.0 | 2.1 | 2.7 |
| CNO | | | | | |
| Increase | mg/min. | 937.8 | 1287.1 | 2302.0 | 1814.4 |
| $CNO/CN_T$ | | | | | |
| | mg/mg | 1.0 | 1.3 | 1.6 | 1.5 |

Ozone utilization for all Examples was 100% for the system as shown in Table 4. A 70%, 83%, 100% and 79% ozone utilization was obtained in Reactor No. 2 for Examples 5 to 8, respectively.

The reduction in $CN_T$ values for Examples 5, 6 and 8 were excellent (exceeded 90%). Example 7 removed the most $CN_T$ with the highest efficiency, however the wastewater flow rates were too high for the amount of ozone available to transfer (100% utilization). CNO values varied slightly in Reactor No. 2 for Example Nos. 5 and 6 which indicates that some of the ozone reacted with the CNO after the oxidizable cyanides were reacted. Example 7 had the greatest increase in CNO since there was insufficient ozone to react with the oxidizable cyanides. Examples 5, 6 and 8 also showed complete removal of $CN_F$ and $CN_{Am-Cl}$, and Example 7 showed 10 and 20 mg/l, respectively in the R2 effluent which was due to the increased flow rate through the system.

Example 5 showed an 85% reduction in copper and iron with Examples 6 and 8 resulting in 90% copper reduction with 40% and 70% iron reductions, respectively. Example 5 and 8 had 90% zinc reductions while Example 6 had a 50% zinc reduction. No significant metal reductions were obtained in Example 7.

EXAMPLES 9 TO 12

These Examples illustrate a Double-Stage Ozone Treatment with Recycling of Treated Effluent of a low cyanide-containing wastewater stream as illustrated in FIG. 4 wherein the wastewater stream in line 61 is first introduced into Reactor No. 1, then to Reactor No. 2 whereafter it is passed to Hold Tank No. 2 for a short period of time and combined with incoming influent in line 61. The influent in line 61 was set at a flow rate of 3 G.P.M. and the recycled effluent was mixed with the influent at approximately 3 G.P.M. This resulted in flow rates of 6 G.P.M. in each Reactor after the first recycling. The initial wastewater influent was reacted 5 minutes each in Reactor No. 1 and No. 2, before discharge into the Hold Tank. After recycling, effluent from Reactor No. 2 was discharged.

In all Examples the $CN_T$ of the influent was about 44.6 mg/l, the $CN_{Am-Cl}$ was 40.1 mg/l for Ex. 9 and 10 and 40.5 mg/l for Examples 11 and 12; the $CN_F$ was 17.5 mg/l for Ex. 9 and 10 and 23.0 for Ex. 11 and 12; and the CNO was about 6.6 for all Examples.

The total copper and iron contents were about 21.5 and 1.3 mg/l respectively for all Examples and the total zinc content was about 0.3 mg/l.

The ozone-containing gas employed was about a 1.60 wt.% ozone-in-air mixture for Examples 9 and 10 and a 2.10 wt.% ozone-in-air mixture for Examples 11 and 12.

In Example 9, the ozone-in-air gas flow was controlled to allow 60% of the generated gas to be directed to Reactor No. 1 and 40% to Reactor No. 2, the exhaust gas from Reactor No. 2 being combined with the 60% fraction before entering Reactor No. 1. The ozone flow in Example 10 was similar to that of Example 9 except that 40% of the generated gas was directed to Reactor No. 1 and 60% to Reactor No. 2. The ozone flow in Example 11 was similar to that of Example 9, and Example 12 was similar to Example 10 except for the increase in ozone concentration as previously mentioned. In addition, exhaust gas from Reactor No. 2 in Examples 11 and 12 was not combined with the fresh ozone-in-air mixture to Reactor No. 1.

Tables 5 and 6 summarize the data obtained for each stage and for the system respectively.

ple 10 had the highest $CN_T$ entering Reactor No. 2 and also had an increase in CNO.

Soluble iron was reduced in the discharged effluent by from 40% to 82% and soluble copper was reduced

TABLE 5

| PARAMETER | | EXAMPLE | | | | | | | |
|---|---|---|---|---|---|---|---|---|---|
| | | 9 | | 10 | | 11 | | 12 | |
| | | R1 | R2 | R1 | R2 | R1 | R2 | R1 | R2 |
| $CN_T$ | | | | | | | | | |
| Influent | mg/l | 44.6 | 5.2 | 44.6 | 13.3 | 44.5 | 4.6 | 44.5 | 5.5 |
| Infl. + Rec. | mg/l | 21.1 | — | 21.1 | — | 18.3 | — | 22.1 | — |
| Effluent | mg/l | 5.2 | 4.3 | 13.3 | 5.3 | 4.6 | 2.5 | 5.5 | 4.2 |
| Reduction | mg/l | 15.9 | 0.9 | 7.8 | 8.0 | 13.7 | 1.9 | 16.6 | 1.3 |
| Flow | l/min. | 22.68 | 22.68 | 22.68 | 22.68 | 22.68 | 22.68 | 22.68 | 22.68 |
| Reduction | mg/min. | 360.6 | 20.4 | 176.9 | 181.4 | 310.7 | 43.1 | 376.5 | 29.5 |
| $O_3$ | | | | | | | | | |
| $O_3$Conc | wt % | 1.30 | 1.60 | 1.30 | 1.50 | 2.20 | 2.10 | 2.20 | 2.10 |
| Flow in | m³/hour | 5.58 | 2.38 | 5.61 | 3.47 | 2.36 | 1.70 | 1.58 | 2.36 |
| Dose | mg/min. | 1470 | 740 | 1480 | 1060 | 1030 | 720 | 700 | 1000 |
| Used | mg/min. | 1400 | 590 | 1410 | 730 | 1010 | 600 | 680 | 810 |
| $O_3/CN_T$ | | | | | | | | | |
| Dose | mg/mg | 4.1 | 36.3 | 8.3 | 5.8 | 3.3 | 16.7 | 1.9 | 33.9 |
| Used | mg/mg | 3.9 | 28.9 | 8.0 | 4.0 | 3.3 | 13.9 | 1.8 | 27.5 |
| % $O_3$reacted | | 95.10 | 80.30 | 95.50 | 68.60 | 98.70 | 82.10 | 98.10 | 80.30 |
| CNO | | | | | | | | | |
| Influent | mg/l | 6.6 | 40.3 | 6.6 | 32.0 | 6.5 | 47.5 | 6.5 | 44.2 |
| Infl. + Rec. | mg/l | 24.4 | — | 24.4 | — | 30.2 | — | 28.1 | — |
| Effluent | mg/l | 40.3 | 41.3 | 32.0 | 54.4 | 47.5 | 48.1 | 44.2 | 48.4 |
| Increase | mg/l | 15.9 | 1.0 | 7.6 | 22.4 | 17.3 | 0.6 | 16.1 | 4.2 |
| Increase | mg/min. | 360.6 | 22.7 | 172.4 | 508.0 | 392.4 | 13.6 | 365.1 | 95.3 |
| $CNO/CN_T$ | | | | | | | | | |
| | mg/mg | 1.0 | 1.1 | 1.0 | 2.8 | 1.3 | 0.3 | 1.0 | 3.2 |
| G/L | | 4.1 | 1.8 | 4.1 | 2.6 | 1.7 | 1.3 | 1.2 | 1.7 |

TABLE 6

| PARAMETER | | EXAMPLE | | | |
|---|---|---|---|---|---|
| | | 9 | 10 | 11 | 12 |
| $CN_T$ | | | | | |
| Reduction | mg/min. | 407.8 | 385.6 | 447.9 | 409.3 |
| $O_3$ | | | | | |
| Dose | mg/min. | 1800 | 1700 | 1700 | 1700 |
| Used | mg/min. | 1730 | 1630 | 1440 | 1370 |
| $O_3/CN_T$ | | | | | |
| Dose | mg/mg | 4.4 | 4.4 | 3.8 | 4.2 |
| Used | mg/mg | 4.2 | 4.2 | 3.2 | 3.3 |
| CNO | | | | | |
| Increase | mg/min. | 787.0 | 1084.1 | 943.5 | 950.3 |
| $CNO/CN_T$ | | | | | |
| | mg/mg | 1.9 | 2.8 | 2.1 | 2.3 |

As the Tables show, ozone utilization was excellent for all Examples but was greater for Examples 11 and 12 (more than 98%) than for 9 and 10 (more than 95%). The gas to liquid ratios for Examples 11 and 12 were less than 2 for both reactors while Examples 9 and 10 used gas to liquid ratios of about 4 and 2 for reactors 1 and 2, respectively. Metal analysis indicated that the amount of iron-complex in the effluent discharged would result in approximately 4 mg $CN_T/l$ of effluent. Only Example 9 slightly exceeded this value indicating substantially complete cyanide destruction. Examples 9, 11 and 12 had essentially no CNO increase in Reactor No. 2 substantiating complete cyanide destruction in addition to some ozone reacting with the CNO. Examfrom about 38% to 84%, the amount of reduction being lowest in Example 9 and highest in Example 12. Zinc reduction was about 67% in Example 11 and 87% in Example 12.

EXAMPLES 13 TO 16

These Examples illustrate a Double-Stage Ozone Treatment with Recycling of Treated Effluent of a high cyanide-containing wastewater stream following the procedure of Examples 9 to 12, respectively.

The $CN_T$ of the influent was 106.5 mg/l for Ex. 13 and 14 and 107.8 mg/l for Ex. 15 and 16. The $CN_{Am-Cl}$ for Example 13 was 79.5 mg/l. No $CN_{Am-Cl}$ for Examples 14 to 16 were determined. The $CN_F$ of Example 13 was 26.0 mg/l and the $CN_F$ for Examples 15 and 16 was 48.0 mg/l. The $CN_F$ for Example 14 was not measured. The CNO for Example 13 and 14 was 17.0 mg/l and for Examples 15 and 16 was 14.0.

Total copper and iron contents in each influent were about 64 mg/l and 4.8 mg/l respectively. Total zinc content was about 0.4 mg/l.

The ozone-containing gas employed was a 1.49 wt.% ozone-in-air mixture (Examples 13 and 14) and a 1.74 wt.% ozone-in-air mixture (Examples 15 and 16). The same ozone dose rates were applied in each Example (3.1 gr./min).

Tables 7 and 8 summarize the relevant process parameters for each stage of each Example and the overall system, respectively.

TABLE 7

| PARAMETER | | EXAMPLE | | | | | | | |
|---|---|---|---|---|---|---|---|---|---|
| | | 13 | | 14 | | 15 | | 16 | |
| | | R1 | R2 | R1 | R2 | R1 | R2 | R1 | R2 |
| $CN_T$ | | | | | | | | | |
| Influent | mg/l | 106.5 | 4.1 | 106.5 | 13.0 | 107.8 | 18.5 | 107.8 | 22.2 |

TABLE 7-continued

| PARAMETER | | EXAMPLE | | | | | | | |
|---|---|---|---|---|---|---|---|---|---|
| | | 13 | | 14 | | 15 | | 16 | |
| | | R1 | R2 | R1 | R2 | R1 | R2 | R1 | R2 |
| Effl + Rec | mg/l | 32.3 | — | 78.3 | — | 60.8 | — | 57.3 | — |
| Effluent | mg/l | 4.1 | 3.4 | 13.0 | 7.3 | 18.5 | 9.0 | 22.2 | 9.8 |
| Reduction | mg/l | 28.2 | 0.7 | 65.3 | 5.7 | 42.3 | 9.5 | 35.1 | 12.4 |
| Flow | l/min. | 22.68 | 22.68 | 22.68 | 22.68 | 22.68 | 22.68 | 22.68 | 22.68 |
| Reduction | mg/min. | 639.6 | 15.9 | 1481.0 | 129.3 | 959.4 | 215.5 | 796.1 | 281.2 |
| $O_3$ | | | | | | | | | |
| $O_3$Conc | wt % | 1.02 | 1.49 | 0.86 | 1.49 | 1.29 | 1.74 | 0.94 | 1.74 |
| Flow in | m³/hour | 10.63 | 4.23 | 10.42 | 6.20 | 9.01 | 3.57 | 9.01 | 5.32 |
| Dose | mg/min. | 2170 | 1260 | 1790 | 1850 | 2330 | 1240 | 1690 | 1850 |
| Used | mg/min. | 2170 | 1010 | 1790 | 1330 | 2330 | 1040 | 1690 | 1390 |
| $O_3/CN_T$ | | | | | | | | | |
| Dose | mg/mg | 3.4 | 79.2 | 1.2 | 14.3 | 2.4 | 5.8 | 2.1 | 6.6 |
| Used | mg/mg | 3.4 | 63.5 | 1.2 | 10.3 | 2.4 | 4.8 | 2.1 | 4.9 |
| CNO | | | | | | | | | |
| Influent | mg/l | 17.0 | 126.0 | 17.0 | 127.0 | 14.0 | 146.0 | 14.0 | 125.0 |
| Infl + Rec | mg/l | 73.0 | — | 42.0 | — | 92.0 | — | 77.0 | — |
| Effluent | mg/l | 126.0 | 163.0 | 127.0 | 143.0 | 146.0 | 168.0 | 125.0 | 155.0 |
| Increase | mg/l | 53.0 | 37.0 | 85.0 | 16.0 | 54.0 | 22.0 | 48.0 | 30.0 |
| Increase | mg/min. | 1202. | 839.2 | 1927.8 | 362.9 | 1224.7 | 499.0 | 1088.6 | 680.4 |
| $CNO/CN_T$ | | | | | | | | | |
| | mg/mg | 1.9 | 52.8 | 1.3 | 2.8 | 1.3 | 2.3 | 1.4 | 2.4 |
| G/L ratio | | 7.8 | 3.1 | 7.7 | 4.6 | 6.6 | 2.6 | 6.6 | 3.9 |

TABLE 8

| PARAMETER | | EXAMPLE | | | |
|---|---|---|---|---|---|
| | | 13 | 14 | 15 | 16 |
| $CN_T$ | | | | | |
| Reduction | mg/min. | 1130.6 | 1042.1 | 1018.4 | 1000.2 |
| $O_3$ | | | | | |
| Dose | mg/min. | 3150 | 3150 | 3140 | 3140 |
| Used | mg/min. | 3150 | 3150 | 3140 | 3140 |
| % $O_3$ reacted | % | 100 | 100 | 100 | 100 |
| $O_3CN_T$ | | | | | |
| Dose | mg/mg | 2.8 | 3.0 | 3.1 | 3.1 |
| Used | mg/mg | 2.8 | 3.0 | 3.1 | 3.1 |
| CNO | | | | | |
| Increase | mg/min. | 3311.3 | 2857.7 | 3492.7 | 3197.9 |
| $CNO/CN_T$ | | | | | |
| | mg/mg | 2.9 | 2.7 | 3.4 | 3.2 |

As the tables show, all Examples had 100% ozone utilization for the system. Ozone dosed and ozone used for Reactor No. 1 in each Example were identical indicating 100% ozone utilization. The $O_3/CN_T$ ratios for Reactor No. 1 in each Example were low, ranging from 1.2 to 2.4 for Examples 14, 15 and 16 and 3.4 for Example 13 with a ratio of approximately 3.0 for the system for all Examples.

All $CN_T$ was removed from the influent as indicated by the effluent and recirculation data (Effl. and Rec.).

EXAMPLES 17 TO 19

These Examples illustrate a Single-Stage Ozone Treatment with Recycling of Effluent of a low cyanide-containing wastewater stream as illustrated in FIG. 4 wherein the wastewater stream in line 61 is introduced into Reactor No. 1, passed to Hold Tank No. 1 and then recycled to line 61 via line 86. The reaction time in each Reactor was about 5 minutes for each Example.

In Example 17, untreated effluent was passed through Reactor No. 1 once at 3 G.P.M. and not recycled. All fresh generated ozone-containing gas was introduced to Reactor No. 1 in one pass.

In Example 18 effluent from Reactor No. 1 was passed to Hold Tank No. 1 (18A) and then recycled through Reactor No. 1 again (18B).

Example 19 comprising retained (19A) and recycled effluent (19B) were the same as 18A and 18B except that the flow rate through the reactors was doubled. (6 G.P.M.)

The $CN_T$ for all Examples was 39.3 mg/l; the $CN_{Am-Cl}$ was 34.6 mg/l; the $CN_F$ was 12.0 mg/l; and the CNO was 3.9 mg/l.

In all cases the ozone-containing gas was a 2.10 wt. % ozone-in-air mixture generated in ozone generator 70.

Tables 9 and 10 below summarize the individual and system parameters.

TABLE 9

| PARAMETER | | EXAMPLE | | | | |
|---|---|---|---|---|---|---|
| | | 17 | 18A | 18B | 19A | 19B |
| $CN_T$ | | | | | | |
| Influent | mg/l | 39.3 | 39.3 | 2.5 | 39.3 | 16.7 |
| Effluent | mg/l | 4.3 | 3.3 | 3.5 | 19.7 | 10.5 |
| Reduction | mg/l | 35.0 | 36.0 | +1.0 | 19.6 | 6.2 |
| Flow | l/min. | 11.34 | 11.34 | 11.34 | 22.68 | 22.68 |
| Reduction | mg/min. | 396.9 | 408.2 | +11.3 | 444.5 | 140.6 |
| $O_3$ | | | | | | |
| $O_3$ Conc | wt % | 2.10 | 2.10 | 2.10 | 2.10 | 2.10 |
| Flow in | m³/hour | 4.25 | 2.38 | 1.70 | 2.38 | 1.70 |
| Dose | mg/min. | 1700 | 980 | 700 | 980 | 700 |
| Used | mg/min. | 1230 | 870 | 400 | 970 | 690 |
| $O_3/CN_T$ | | | | | | |
| Dose | mg/mg | 4.3 | 2.4 | — | 2.2 | 5.0 |
| Used | mg/mg | 3.1 | 2.1 | — | 2.2 | 4.9 |
| CNO | | | | | | |
| Influent | mg/l | 3.9 | 3.9 | 22.2 | 3.9 | 19.1 |
| Effluent | mg/l | 21.9 | 23.4 | 23.1 | 18.1 | 24.4 |
| Increase | mg/l | 18.0 | 19.5 | 0.9 | 14.2 | 5.3 |
| Increase | mg/min. | 204.1 | 221.1 | 10.2 | 161.0 | 60.1 |
| $CNO/CN_T$ | | | | | | |
| | mg/mg | 0.5 | 0.5 | — | 0.4 | 0.4 |
| G/L | | 6.3 | 3.5 | 2.5 | 1.8 | 1.3 |

TABLE 10

| PARAMETER | | EXAMPLE | | |
|---|---|---|---|---|
| | | 17 | 18 | 19 |
| $CN_T$ | | | | |
| Reduction | mg/min. | 396.9 | 396.9 | 585.1 |
| $O_3$ | | | | |
| Dose | mg/min. | 1700 | 1680 | 1680 |
| Used | mg/min. | 1230 | 1270 | 1660 |
| % $O_3$ reacted | | | | |

TABLE 10-continued

| PARAMETER | | EXAMPLE | | |
|---|---|---|---|---|
| | | 17 | 18 | 19 |
| $O_3CN_T$ | | | | |
| Dose | mg/mg | 4.3 | 4.2 | 2.9 |
| Used | mg/mg | 3.1 | 3.2 | 2.8 |
| CNO | | | | |
| Increase | mg/min. | 204.1 | 217.7 | 464.9 |
| $CNO/CN_T$ | mg/mg | 0.5 | 0.6 | 0.8 |

As the tables show, a 70% ozone utilization was accomplished for Example 17, while 18 and 19 had a 76% and 99% ozone utilization, respectively. Example 19 had a high efficiency due to the high flow rate (6 G.P.M.) and low G/L ratios. (1.8 for 19A and 1.3 for 19B). No excess ozone was recycled in these Examples since only one Reaction Tank having a bottom feed configuration was available. This configuration tank can be used for both Reaction Tanks (No. 1 and No. 2) in a double stage system with ozone containing gas flow being the same as in previous Examples.

All Examples showed substantial destruction of $CN_T$. In addition, the $CN_{Am-Cl}$ was eliminated in Examples 17 and 18 while Example 10B had about 6.9 mg/l left in the effluent.

EXAMPLES 20 AND 21

In Example 20, a low cyanide-containing wastewater influent having the same composition as that of Examples 1 to 4 was treated according to the procedure of Example 1 (Double-Stage Ozone Treatment) to substantially destroy all cyanides contained therein and then further treated to destroy cyanate in a third ozoneation stage as shown in FIG. 5, ie, using Reactor No. 3.

The procedure comprised introducing the cyanide-depleted effluent containing about 47 mg CNO/l into an ozone-reactor containing a gas turbine ozone injector and recycling the effluent through a holding tank and then through the reactor again continuously for about 3 hours (180 minutes) at 3 G.P.M. A 2.0 wt. % ozone-in-air mixture at a flow rate of 2.5 m³/hr. (58.8 gr/hr of ozone) was continuously introduced into the reactor for the entire period.

Referring to FIG. 5, this procedure simulated introducing a cyanide-depleted, cyanate-containing effluent in line 83 to Reactor No. 3 and allowing ozone-containing gas from generator 111 to be introduced to Reactor No. 3 through line 115 for about 3 hours after which treated effluent was withdrawn in line 106 via line 105.

Analysis for cyanate and ozone were conducted every 10 minutes during the procedure.

Table 11 summarizes the results.

TABLE 11

| | (Ex. 20) | | | |
|---|---|---|---|---|
| Time (mins.) | CNO mg/l | $O_3$ EXHAUST gr./hr. | $O_3$ USED gr./hr. | $O_3$ USED % |
| 0 | 47.2 | — | — | — |
| 10 | 30.8 | 28.2 | 30.6 | 52.0 |
| 20 | 28.8 | 27.0 | 31.8 | 54.1 |
| 30 | 21.4 | 27.3 | 31.5 | 53.6 |
| 40 | 12.5 | 30.3 | 28.5 | 48.5 |
| 50 | 10.8 | 34.2 | 24.6 | 41.8 |
| 60 | 11.1 | 35.7 | 23.1 | 39.3 |
| 70 | 9.3 | 37.5 | 21.3 | 36.2 |
| 80 | 6.4 | 42.3 | 16.5 | 28.1 |
| 90 | 4.9 | 43.8 | 15.0 | 25.5 |

TABLE 11-continued

| | (Ex. 20) | | | |
|---|---|---|---|---|
| Time (mins.) | CNO mg/l | $O_3$ EXHAUST gr./hr. | $O_3$ USED gr./hr. | $O_3$ USED % |
| 100 | 3.9 | 45.6 | 13.2 | 22.4 |
| 110 | 3.4 | 47.4 | 11.4 | 19.4 |
| 120 | 3.9 | 46.8 | 12.0 | 20.4 |
| 140 | 3.0 | 49.2 | 9.6 | 16.3 |
| 160 | 1.7 | 51.0 | 7.8 | 13.3 |
| 180 | 1.0 | 47.4 | 11.4 | 19.4 |

As the table shows, the initial value of 47 mg CNO/l was reduced by more than 50% (21.4 mg CNO/l) in 30 minutes and by more then 75% (11 mg CNO) in 60 minutes. A value of 1 mg CNO/l was obtained after 180 minutes. More than 50% ozone utilization was obtained during the first 30 minutes and decreased thereafter as the CNO decreased.

In Example 21, the same procedure as outlined above was used for a high-cyanide-containing wastewater influent. After depletion of cyanides according to the procedure of Example 5, a cyanide-depleted effluent containing about 92 mg CNO/l was contacted with a 2.2% ozone-in-air mixture for 4 hours according to the procedure of Example 20. The ozone gas flow was 5.3 m³/hr. (137.4 gr./hr. of ozone).

Analysis for cyanate and ozone were conducted every 15 minutes.

Table 12 summarizes the results.

TABLE 12

| | (Ex. 21) | | | |
|---|---|---|---|---|
| Time (mins.) | CNO mg/l | $O_3$ EXHAUST gr./hr. | $O_3$ USED gr./hr. | $O_3$ USED % |
| 0 | 92.3 | 79.2 | 58.2 | 42 |
| 15 | 51.9 | 80.1 | 57.3 | 42 |
| 30 | 50.7 | 84.6 | 52.8 | 38 |
| 45 | 50.2 | 92.2 | 45.2 | 33 |
| 60 | — | 99.2 | 38.2 | 28 |
| 75 | — | 108.7 | 28.7 | 21 |
| 90 | 27.6 | 113.7 | 23.7 | 17 |
| 105 | 28.5 | 117.0 | 20.4 | 15 |
| 120 | 19.2 | 119.6 | 17.8 | 13 |
| 150 | 11.3 | 124.0 | 13.4 | 10 |
| 180 | 5.2 | 124.7 | 12.7 | 9 |
| 210 | 4.7 | 129.7 | 7.7 | 6 |
| 240 | 2.5 | 132.3 | 5.1 | 4 |

As table 12 shows, the CNO was reduced by 46% (50 mg CNO/l) in 30 minutes and by 70% (28 mg CNO/l) in 90 minutes. A value of 2.5 mg CNO/l was obtained after 4 hours.

Between 38% to 42% ozone utilization was obtained during the first 30 minutes and deceased as the CNO decreased to less than 20% after 90 minutes.

EXAMPLES 22 AND 23

In these Examples, a low and high cyanide-containing wastewater influent was first depleted of cyanides according to the procedure of Examples 18A and 18B (Single-Stage Ozone Treatment with Recycling of Effluent) and then introduced to further ozone contacting zones to destroy cyanate as shown in FIG. 5.

In Example 22, a low cyanide-depleted influent containing about 21 mg CNO/l was introduced into Reactor No. 1 containing a gas turbine ozone injector at a flow rate of 3 G.P.M. After treatment with an ozone-containing gas, the effluent from Reactor No. 1 was introduced into Reactor No. 2, treated with an ozone-containing gas, withdrawn and introduced to Hold Tank No. 2. From Hold Tank No. 2 the effluent was re-introduced to Reactor No. 1 and the entire process repeated for 3 hours (180 minutes). A 1.9 wt. % ozone-in-air mixture was continuously introduced into Reactor No. 2 at a flow rate of 2.5 m³/hr.(56.3 gr/hr of ozone) as the ozone-containing gas and the exhaust therefrom used as the ozone-containing gas for Reactor No. 1.

Referring to FIG. 5, this procedure simulated introducing a cyanide-depleted, cyanate-containing effluent from Reactor No. 2 in line 83 to Reactor No. 3 for 90 minutes reaction time with ozone-containing gas, withdrawing effluent in line 105 and introducing it to Reactor No. 4 for another 90 minutes. After which the effluent is withdrawn in lines 107 to 108. Ozone-containing gas flow simulated introducing the gas generated in generator 111 to Reactor No. 4 through line 112 and withdrawing the exhaust gas therefrom in line 119 for introduction to Reactor No. 3.

Analysis of CNO and ozone were taken after every 10 to 15 minutes. The results are summarized in Table 13 below.

TABLE 13
(Ex. 22)

| Time (mins.) | CNO mg/l | O₃ EXHAUST gr./hr. R1 | R2 | O₃ USED gr./hr. R1 | R2 | O₃ USED % |
|---|---|---|---|---|---|---|
| 0 | 21.4 | 9.0 | 18.0 | 9.0 | 38.3 | 84 |
| 10 | 15.0 | 8.4 | 16.2 | 7.8 | 40.1 | 85 |
| 20 | 11.1 | 10.1 | 18.6 | 8.5 | 37.7 | 82 |
| 30 | 9.3 | 13.8 | 24.0 | 10.2 | 32.3 | 75 |
| 40 | 5.4 | 16.8 | 27.3 | 10.5 | 29.0 | 70 |
| 50 | 4.4 | 19.2 | 27.6 | 2.4 | 28.7 | 55 |
| 60 | 3.4 | 23.1 | 27.0 | 3.9 | 29.3 | 59 |
| 75 | 2.7 | 27.6 | 30.3 | 2.7 | 26.0 | 51 |
| 90 | 2.0 | 33.6 | 38.6 | 5.0 | 17.7 | 40 |
| 105 | 2.2 | 39.0 | 42.0 | 3.0 | 14.3 | 31 |
| 120 | 1.5 | 40.8 | 48.0 | 7.2 | 8.3 | 28 |
| 150 | 1.2 | 42.6 | 48.0 | 5.4 | 8.3 | 24 |
| 180 | 0.7 | 44.1 | 49.2 | 5.1 | 7.1 | 22 |

As table 13 shows, an initial value of 21 mg CNO/l was reduced by about 50% in 20 minutes and by 86% (3.4 mg. CNO/l) after 60 minutes. A value of 0.7 mg CNO/l was obtained after 180 minutes; however after about 40 minutes, CNO destruction decreased slowly with time. This procedure resulted in a more rapid CNO destruction than in Example 20. More than 75% ozone utilization was obtained during the first 30 minutes. Ozone utilization continued to decrease as the CNO decreased, but more than 50% of the dose rate was used up to 75 minutes reaction time. Therefore this flow scheme greatly improved the ozone utilization for cyanate destruction compared to Example 20.

Example 23 followed the procedure of Example 22 except that the cyanide-depleted, influent was derived from a high cyanide-containing wastewater influent and contained 95.2 mg CNO/l. The ozone-containing gas used was a 2.0 wt. % ozone-in-air mixture at a flow rate of 5.3 m³/hr. (128.5 gr/hr of ozone). Total reaction time was 240 minutes (4 hours).

Analysis for CNO and ozone was conducted every 15 minutes.

Table 14 summarizes the results.

TABLE 14
(Ex. 23)

| Time (mins.) | CNO mg/l | O₃ EXHAUST gr./hr. R1 | R2 | O₃ USED gr./hr. R1 | R2 | O₃ USED % |
|---|---|---|---|---|---|---|
| 0 | 95.2 | 26.7 | 66.8 | 40.1 | 61.7 | 79 |
| 15 | 40.2 | 44.5 | 78.9 | 34.4 | 49.6 | 65 |
| 30 | 33.7 | 66.1 | 94.1 | 28.0 | 34.4 | 49 |
| 45 | 28.3 | 72.5 | 100.5 | 28.0 | 28.0 | 44 |
| 60 | 16.8 | 86.5 | 106.8 | 20.3 | 21.7 | 33 |
| 75 | 13.5 | 90.3 | 111.9 | 21.6 | 16.6 | 30 |
| 90 | 13.3 | 94.1 | 115.8 | 21.7 | 12.7 | 27 |
| 105 | 8.5 | 94.1 | 118.3 | 24.2 | 10.2 | 27 |
| 120 | 8.9 | 95.4 | 118.3 | 22.9 | 10.2 | 26 |
| 150 | 3.0 | 95.7 | 119.6 | 23.9 | 8.9 | 26 |
| 180 | 3.2 | 95.2 | 119.6 | 24.4 | 8.9 | 26 |
| 210 | 2.2 | 99.2 | 119.6 | 20.4 | 8.9 | 23 |
| 240 | 1.0 | 102.4 | 119.6 | 17.2 | 8.9 | 20 |

As Table 14 shows, the initial value of 95.2 mg CNO/l was reduced by 65% (34 mg CNO/l) in 30 minutes and by 82% (17 mg CNO/l) in 60 minutes. Less than 10 mg CNO/l was obtained in 105 minutes with 1 mg CNO/l in the effluent after 240 minutes reaction time.

About 50% ozone utilization was obtained during the first 30 minutes and 30% was still obtained after 75 minutes.

I claim:

1. A process for treating an aqueous cyanide-containing influent consisting essentially of:
    (a) providing an ozone-contacting zone having an operating turbine gas injector associated therewith, said injector comprising:
        a hollow casing extending into said zone having an enlarged section at the lower end thereof, said enlarged section having an annular elongated gap which communicates with said zone;
        a shaft rotatably mounted in said casing;
        a turbine-bladed impeller rotor mounted on said shaft and extending into said enlarged section, said rotor having a liquid intake section;
        means for rotating said shaft; and
        a gas inlet communicating with said casing above said enlarged section;
    (b) introducing said influent to said ozone-contacting zone; at least a portion of said influent being introduced to said liquid intake section;
    (c) introducing an ozone-containing gas to said gas inlet;
    (d) mixing by spinning said impeller at least a portion of said influent with said ozone-containing gas in said enlarged section to form a stream of bubbles of ozone-containing as in said influent and injecting said stream into said zone;
    (e) withdrawing a cyanide-depleted effluent from said zone;
    (f) combining at least a portion of said cyanide depleted effluent with said cyanide-containing influent; and
    (g) repeating steps (b) to (e).

2. The process of claim 1 wherein said ozone-containing gas is selected from the group consisting of ozone-in-air, ozone-oxygen, and ozone in a mixture of air and oxygen.

3. The process of claim 1 wherein said portion of said cyanide-depleted effluent is retained in a holding zone before being combined with said cyanide-containing influent.

4. The process of claim 1 wherein said bubbles have an average size of from about ½ mm. to about 60 mm.

5. The process of claim 1 wherein said influent further comprises cyanate and a metal selected from the group consisting of iron, copper, zinc and mixtures thereof.

6. A process for treating a cyanide-containing aqueous influent consisting essentially of:
(a) providing a first and second ozone contacting zone, each zone having an operating turbine gas injector associated therewith, said injector comprising:
a hollow casing extending into said zone having an enlarged section at the lower end thereof, said enlarged section having an annular elongated gap which communicates with said zone;
a shaft rotatably mounted in said casing;
a turbine-bladed impeller rotor mounted on said shaft and extending into said enlarged section, said rotor having a liquid intake section;
means for rotating said shaft; and
a gas inlet communicating with said casing above said enlarged section;
(b) introducing said cyanide-containing influent into said first ozone-contacting zone, at least a portion of said influent being introduced to said liquid intake section;
(c) introducing a second ozone-containing gas into said gas inlet of said injector in said first zone, at least a portion of said second ozone-containing gas comprising a first ozone-depleted gas withdrawn from said second contact zone;
(d) mixing by spinning said impeller of said injector in said first zone at least a portion of said influent with said second ozone-containing gas in said enlarged section to form a stream of bubbles of said second ozone-containing gas in said influent and injecting said stream into said first zone to form a first cyanide-depleted effluent;
(e) withdrawing said first cyanide-depleted effluent from said zone;
(f) introducing said first cyanide-depleted effluent into said second ozone-contacting zone, at least a portion of said effluent being introduced to said liquid intake section of said injector in said second zone;
(g) introducing a first ozone-containing gas into said gas inlet of said injector in said second zone;
(h) mixing by spinning said impeller of said injector in said second zone at least a portion of said first cyanide-depleted effluent with said first ozone-containing gas in said enlarged section to form a stream of bubbles of said first ozone-containing gas in said effluent and injecting said stream into said second zone to form a second cyanide-depleted effluent and a first ozone-depleted gas;
(i) withdrawing said first ozone-depleted gas from said second contact zone; and
(j) withdrawing said second cyanide-depleted effluent from said second zone.

7. The process of claim 6 wherein each of said first and said second ozone-containing gases is selected from the group consisting of ozone-in-air, ozone-oxygen, and ozone in a mixture of air and oxygen.

8. The process of claim 6 wherein said first ozone-containing gas is an ozone-in-air mixture comprising from about 1.0% to 3.5% by weight of ozone.

9. The process of claim 6 wherein said first ozone-containing gas is an ozone-in-oxygen or ozone-in-air and oxygen mixture comprising from about 2.5% to about 7.5% by weight of ozone.

10. The process of claim 6 wherein all of said second ozone-containing gas comprises said first ozone-depleted gas.

11. The process of claim 6 wherein from about 1% to about 99% of said second ozone-containing gas is comprised of said first ozone-depleted gas.

12. The process of claim 6 wherein at least a portion of said second cyanide-depleted effluent is combined with said cyanide-containing aqueous influent.

13. The process of claim 12 wherein said portion of said second cyanide-depleted effluent is retained in a holding zone before being combined with said cyanide-containing aqueous influent.

14. The process of claim 6 wherein all of said influent is introduced directly to said liquid intake section of said impeller rotor.

15. The process of claim 6 wherein said bubbles have an average size of between about ½ mm. and 60 mm.

16. The process of claim 6 wherein said bubbles have an average size of from ½ mm. to 60 mm.

17. The process of claim 6 wherein said cyanide-containing aqueous influent further comprises cyanate and a metal selected from the group consisting of iron, copper, zinc and mixtures thereof, a portion of said cyanate being oxidized and said metal being precipitated in said zones.

18. The process of claim 6, wherein said influent further contains cyanate and said first and second cyanide-depleted effluent contain cyanate formed by ozonation of said cyanide-containing influent in said zones.

19. The process of claim 18, wherein at least a portion of said second cyanide-depleted effluent is further treated by the steps of:
(k) introducing said second effluent to a third ozone contacting zone;
(l) contacting said second effluent with an ozone-containing gas until a cyanate depleted effluent is obtained; and
(m) withdrawing said cyanate-depleted effluent from said zone.

20. The process of claim 19 wherein said ozone-containing gas is selected from the group consisting of ozone-in-air, ozone-oxygen, and ozone in a mixture of air and oxygen.

21. The process of claim 19 wherein said ozone-containing gas is an ozone-in-air mixture containing from about 1.0% to 3.5% ozone by weight.

22. The process of claim 19 wherein said ozone-containing gas is an ozone-in-oxygen or ozone in a mixture of air and oxygen containing from about 2.5% to 7.5% ozone by weight.

23. The process of claim 18, wherein at least a portion of said second cyanide-depleted effluent is further treated by:
(k) introducing said second effluent successively into a plurality of further ozone-contacting zones arranged in series;
(l) contacting said effluent with an ozone-containing gas in each zone successively to form a cyanate depleted effluent, at least a portion of the ozone-containing gas in the earlier zones being comprised of an ozone depleted gas withdrawn from a latter zone; and (m) withdrawing a cyanate-depleted effluent from any one of said zones.

24. The process of claim 23 which comprises two ozone-contacting zones.

25. The process of claim 23 which comprises three ozone-contacting zones.

26. The process of claim 23 wherein said ozone-containing gas is selected from the group consisting of ozone-in-air, ozone-oxygen, and ozone in a mixture of air and oxygen.

27. The process of claim 23 wherein said ozone-containing gas is an ozone-in-air mixture containing from about 0.1% to 3.5% ozone by weight.

28. The process of claim 23 wherein said ozone-containing gas is an ozone-in-oxygen or ozone in a mixture of air and oxygen containing from about 2.5% to 7.5% ozone by weight.

29. A process for treating a cyanide-containing aqueous influent consisting essentially of:
   (a) providing a first and second ozone contacting zone, each zone having an operating turbine gas injector associated therewith, said injector comprising:
      a hollow casing extending into said zone having an enlarged section at the lower end thereof, said enlarged section having an annular elongated gap which extends into said zone;
      a shaft rotatably mounted in said casing;
      a turbine bladed impeller rotor mounted on said shaft and extending into said enlarged section, said rotor having a liquid intake section;
      means for rotating said shaft; and
      a gas inlet communicating with said casing above said enlarged section;
   (b) introducing said cyanide-containing influent into said first ozone-contacting zone, at least a portion of said influent being introduced to said liquid intake section;
   (c) introducing a second ozone-containing gas into said gas inlet of said injector in said first zone, at least a portion of said second ozone-containing gas comprising a first ozone-depleted depleted gas withdrawn from said second contact zone;
   (d) mixing by spinning said impeller of said injector in said first zone at least a portion of said influent with said second ozone-containing gas in said enlarged section to form a stream of bubbles of said second ozone-containing gas in said influent and injecting said stream into said first zone to form a first cyanide-depleted effluent;
   (e) withdrawing said first cyanide-depleted effluent from said zone;
   (f) introducing said first cyanide-depleted effluent into said second ozone-contacting zone, at least a portion of said effluent being introduced to said liquid intake section of said injector in said second zone;
   (g) introducing a first ozone-containing gas into said gas inlet of said injector in said second zone;
   (h) mixing by spinning said impeller of said injector in said second zone at least a portion of said cyanide-depleted effluent with said first ozone-containing gas in said enlarged section to form a stream of bubbles of said first ozone-containing gas in said effluent and injecting said stream into said second zone to form a second cyanide-depleted effluent and a first ozone-depleted gas;
   (i) withdrawing said first ozone-depleted gas from said second zone;
   (j) withdrawing said second cyanide-depleted effluent from said second zone;
   (k) combining at least a portion of said second cyanide-depleted effluent with said cyanide containing aqueous influent; and
   (l) repeating steps (b) to (j).

30. The process of claim 29 wherein each of said first and said second ozone-containing gases is selected from the group consisting of ozone-in-air, ozone-oxygen, and ozone in a mixture of air and oxygen.

31. The process of claim 29 wherein said first ozone-containing gas is an ozone-in-air mixture comprising from about 1.0% to 3.5% by weight of ozone.

32. The process of claim 29 wherein said first ozone-containing gas is an ozone-in-oxygen or ozone-in-air and oxygen mixture comprising from about 2.5% to 7.5% by weight of ozone.

33. The process of claim 29 wherein all of said second ozone-containing gas comprises said first ozone-depleted gas.

34. The process of claim 29 wherein from about 1% to about 99% of said second ozone-containing gas is comprised of said first ozone-depleted gas.

35. The process of claim 29 wherein said portion of said second cyanide-depleted effluent is retained in a holding zone before being combined with said cyanide-containing aqueous influent.

36. The process of claim 29 which further comprises combining a portion of said first cyanide-depleted effluent withdrawn from said first zone with said cyanide-containing aqueous influent, and repeating at least said steps (b) to (e).

37. The process of claim 36 wherein said portion of said first cyanide-depleted effluent is retained in a holding zone before being combined with said cyanide-containing aqueous influent.

38. The process of claim 29 wherein said cyanide-containing aqueous influent further comprises cyanate and a metal selected from the group consisting of iron, copper, zinc and mixtures thereof, a portion of said cyanate being oxidized and said metal being precipitated in said zones.

* * * * *